US009473541B2

(12) United States Patent
Miyazawa

(10) Patent No.: US 9,473,541 B2
(45) Date of Patent: Oct. 18, 2016

(54) COMMUNICATION DEVICE AND NON-TRANSITORY COMPUTER-READABLE MEDIUM

(71) Applicant: Brother Kogyo Kabushiki Kaisha, Nagoya-shi, Aichi-ken (JP)

(72) Inventor: Jun Miyazawa, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 153 days.

(21) Appl. No.: 14/550,174

(22) Filed: Nov. 21, 2014

(65) Prior Publication Data
US 2015/0156222 A1 Jun. 4, 2015

(30) Foreign Application Priority Data

Nov. 29, 2013 (JP) .................. 2013-246882

(51) Int. Cl.
*H04L 12/66* (2006.01)
*H04L 29/06* (2006.01)
*H04M 3/56* (2006.01)
*H04N 7/15* (2006.01)
*H04L 12/26* (2006.01)
*H04N 7/14* (2006.01)

(52) U.S. Cl.
CPC ......... *H04L 65/1046* (2013.01); *H04L 43/087* (2013.01); *H04L 65/403* (2013.01); *H04L 65/605* (2013.01); *H04M 3/568* (2013.01); *H04N 7/147* (2013.01); *H04N 7/15* (2013.01); *H04N 7/152* (2013.01)

(58) Field of Classification Search
CPC .................. H04L 29/06027; H04L 29/06326; H04L 29/06; H04L 12/66; H04M 7/006
See application file for complete search history.

(56) References Cited

U.S. PATENT DOCUMENTS 6,525,523 B1 * 2/2003 Soma ...................... H04L 1/205
324/76.77
6,661,836 B1 * 12/2003 Dalal ...................... G01R 29/02
375/226
6,744,813 B1 * 6/2004 Ko ............................. H04B 3/46
375/224

(Continued)

FOREIGN PATENT DOCUMENTS

JP 2000-349824 A 12/2000
JP 2006-500808 A 1/2006
WO 0059166 A 10/2000

Primary Examiner — Mark Rinehart
Assistant Examiner — Sanjay K Dewan
(74) Attorney, Agent, or Firm — Banner & Witcoff, Ltd.

(57) ABSTRACT

A non-transitory computer-readable medium stores computer-readable instructions performing processes including a determination, a setting, a first generation, a second generation and a transmission operations. The determination operation determines whether a communication state is a first or second state based on at least one of transmission data transmitted by the communication device to a conference server and reception data received by the communication device from the conference server. The setting operation sets a combined time to a first or second period of time in response to the determination operation. The first generation operation generates sound data corresponding to the combined time, by sequentially compressing sampling data corresponding to the combined time in an order of storage in a first storage portion. The second generation operation generates a packet including the sound data. The transmission operation transmits the packet to the conference server at a cycle corresponding to the combined time.

18 Claims, 13 Drawing Sheets

(56) References Cited

U.S. PATENT DOCUMENTS

| | | | |
|---|---|---|---|
| 6,768,731 B1 * | 7/2004 | Huh | H04L 29/06027 370/352 |
| 6,950,764 B2 * | 9/2005 | Ennis | H02H 7/266 307/38 |
| 7,346,007 B2 | 3/2008 | Curcio et al. | |
| 7,483,417 B2 * | 1/2009 | Farris | H04L 12/66 370/252 |
| 7,773,581 B2 * | 8/2010 | Punj | H04L 12/1813 348/14.01 |
| 7,916,653 B2 * | 3/2011 | Firestone | H04L 12/66 370/252 |
| 8,665,861 B1 * | 3/2014 | Bajpay | H04L 43/0852 370/229 |
| 8,824,956 B1 * | 9/2014 | Zhang | G06F 13/4291 455/3.06 |
| 2004/0057420 A1 | 3/2004 | Curcio et al. | |

\* cited by examiner

FIG. 8

| ID | JITTER (ms) | COMPARISON VAL (ms) | ~1142 |
|----|-------------|---------------------|-------|
| 11 | 10 | 30 | |
| 12 | 2 | 3 | |
| 13 | 8 | 50 | |

FIG. 10

| JITTER RANGE (ms) | J≦10 | 10<J≦20 | 20<J≦30 | 30<J≦40 | 40<J≦50 | 50<J |
|---|---|---|---|---|---|---|
| COMBINED AMOUNT | 1 | 2 | 3 | 4 | 5 | 6 |
| 1ST PROVIONAL TIME (ms) | 20 | 40 | 60 | 80 | 100 | 120 |

~1141

COMMUNICATION DEVICE AND NON-TRANSITORY COMPUTER-READABLE MEDIUM

CROSS-REFERENCE TO RELATED APPLICATION

This application claims priority to Japanese Patent Application No. 2013-246882 filed on Nov. 29, 2013, the disclosure of which is herein incorporated by reference in its entirety.

BACKGROUND

The present disclosure relates to a communication device that is capable of communication with a plurality of counterpart devices via a network, and to a non-transitory computer-readable medium.

A system is known that allows spoken communication between users of each of a plurality of communication devices. In this system, each of the plurality of communication devices performs communication of data of sound (hereinafter referred to as sound data) with the other communication devices. As known technology, a technology is disclosed in which a transmission interval of an audio data packet from a transmitting device is equal to or less than 60 milliseconds (hereinafter, millisecond and milliseconds are referred to as ms), or more preferably, is approximately 20 ms. According to this technology, even if a data packet is lost during communication, the user of a receiving device does not easily notice a gap in the conversational voice.

SUMMARY

A time that is required for each of a plurality of sound data transmitted from a specific communication device to reach another communication device via a network may vary, depending on network conditions and so on. Hereinafter, the time required from when the sound data is transmitted from the specific communication device to the time at which the sound data is received by the other communication device is referred to as a delay time. Variations in the delay time of each of the plurality of sound data are referred to as jitter. In order to maintain the quality of spoken communication, it is desirable for jitter to be low.

When jitter is high, even when the specific communication device transmits the plurality of sound data at a constant cycle, using the above-described known technology, an interval at which the plurality of sound data are received by the other communication device becomes unstable. In this case, an interval at which the other communication device outputs sound based on each of the plurality of sound data also becomes unstable. As a result, when there is a long interval between the sound output by the other communication device, there is a possibility that gaps occur in the output sound. Thus, the above-described known technology does no more than set the transmission interval of the plurality of sound data from the specific communication device as a predetermined interval, and cannot reduce the jitter when the plurality of sound data are received by the other communication device.

On the other hand, as known technology that inhibits deterioration in spoken communication quality caused by jitter, a technology is known in which a predetermined amount of the sound data is constantly stored (i.e., buffered) in a storage device (a RAM or the like) by the receiving side communication device and the receiving side communication device outputs sound based on the stored sound data. When this known technology is used, a time required from when the plurality of pieces of sound data are transmitted from the specific communication device to when the sound based on the plurality of pieces of sound data is output by the other communication device becomes long. As a result, even when this known technology is used, there is a case in which a "real-time" feeling of the conversation (i.e., instantaneity) deteriorates.

Various exemplary embodiments of the general principles described herein provide a communication device that inhibits a deterioration in spoken communication quality by reducing jitter, and a non-transitory computer-readable medium.

The embodiments described herein provide a non-transitory computer-readable medium storing computer-readable instructions. The instructions, when executed by a processor of a communication device configured to connect a network, perform processes including a first judgment operation, a first generation operation, a storage operation, a determination operation, a setting operation, a second judgment operation, a second generation operation and a transmission operation.

The first judgment operation is an operation that judges whether sampling data of sound corresponding to a period of time equal to or greater than a predetermined period of time is stored in a first storage portion. The first generation operation is an operation that sequentially generates, in response to the first judgment operation judging that the sampling data of sound for the first period of time equal to or greater than the predetermined period of time is stored in the first storage portion, unit sound data, by sequentially compressing the sampling data that corresponds to the predetermined period of time and that is stored in the first storage portion, in an order of storage in the first storage portion. The storage operation is an operation that stores the unit sound data. The determination operation is an operation that determines whether a communication state of the network is one of a first state and a second state different from the first state, based on at least one of transmission data that is transmitted to the network and reception data that is received from the network. The setting operation is an operation that sets a combined time that corresponds to a length of time of sound in sound data included in a single packet. The combined time is set to one of a first period of time and a second period of time longer than the first period of time. The combined time is set to the first period of time when the determination operation determines that the communication state is the first state. Further, the combined time is set to the second period of time when the determination operation determines that the communication state is the second state. The second judgment operation is an operation that judges whether the unit sound data corresponding to a period of time equal to or greater than the combined time is stored in the second storage portion. The second generation operation is an operation that, in response to the second judgment operation judging that the unit sound data corresponding to the period of time equal to or greater than the combined time is stored in the second storage portion, generates the packet that includes the unit sound data corresponding to the combined time. The transmission operation is an operation that transmits, to at least one counterpart device at a cycle corresponding to the combined time, the packet generated by the second generation operation.

The embodiments described herein also provide a communication device. The communication device includes a processor and a memory storing computer-readable instructions. When executed by the processor of the communication device, the instructions perform processes including a first judgment operation, a first generation operation, a storage operation, a determination operation, a setting operation, a second judgment operation, a second generation operation and a transmission operation. Each of the operations is similar to that of the non-transitory computer-readable medium.

The embodiments described herein also provide a non-transitory computer-readable medium storing computer-readable instructions. When executed by a processor of a communication device, the instructions perform processes including a determination operation, a setting operation, a first generation operation, a second generation operation and a transmission operation.

The determination operation is an operation that determines whether a communication state with a conference server via a network is one of a first state and a second state different from the first state, based on at least one of transmission data that is transmitted by the communication device to the conference server, which is capable of data communication with the communication device via the network, and reception data that is received by the communication device from the conference server. The setting operation is an operation that sets a first period of time as a combined time in response to the determination operation determining that the communication state is the first state, and sets, as the combined time, a second period of time that is longer than the first period of time in response to the determination operation determining that the communication state is the second state. The first generation operation is an operation that generates, from sampling data of sound that is stored in a first storage portion, sound data corresponding to the combined time, by sequentially compressing the sampling data corresponding to the combined time in an order of storage in the first storage portion. The second generation operation is an operation that generates a packet including the sound data. The transmission operation is an operation that transmits the packet to the conference server at a cycle corresponding to the combined time.

BRIEF DESCRIPTION OF THE DRAWINGS

Embodiments will be described below in detail with reference to the accompanying drawings in which:

FIG. 8 is a diagram showing a table 1142;

FIG. 10 is a diagram showing a table 1141;

DETAILED DESCRIPTION

Figure 1:
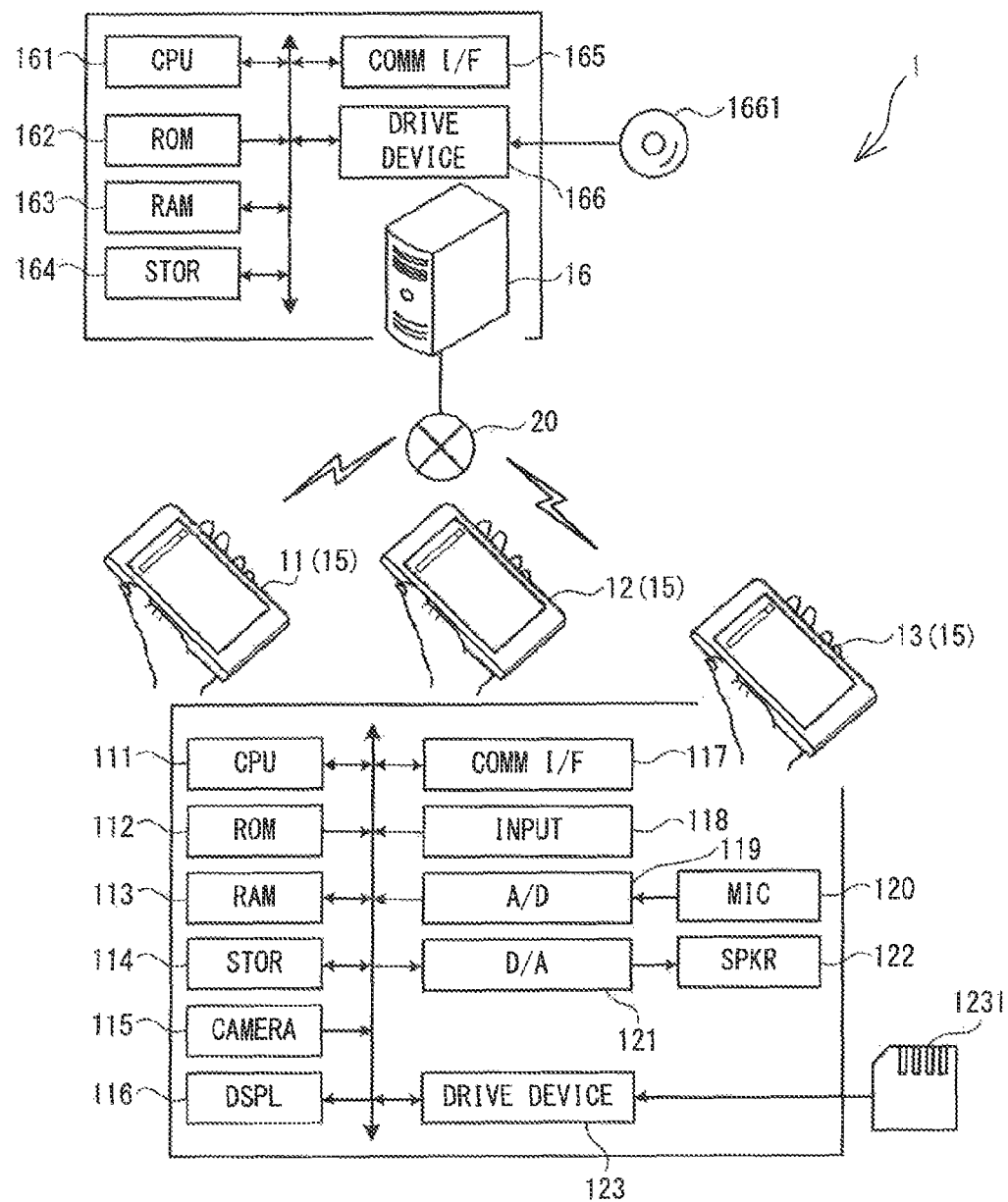
FIG. 1 is a diagram showing an overview of a teleconference system and an electrical configuration of a communication device and a server.

A teleconference system 1 will be explained with reference to FIG. 1. The teleconference system 1 is provided with communication devices 11, 12 and 13 and a server 16. Hereinafter, the communication devices 11 to 13 will sometimes be collectively referred to as a communication device 15 or as communication devices 15. The communication device 15 and the server 16 are connected such that they can perform communication via a network 20. The communication device 15 is a known smart phone. The server 16 is a known multi-point control unit (MCU). Note that at least one of the communication devices 11 to 13 may be a terminal dedicated to teleconferencing, a general-purpose personal computer (PC), a tablet PC or the like. The server 16 may be a general-purpose server.

An electrical configuration of the communication device 15 will be explained. The communication device 15 is provided with a CPU 111 that controls the communication device 15. The CPU 111 is electrically connected to a ROM 112, a RAM 113, a storage portion 114, a camera 115, a display 116, a communication I/F 117, an input portion 118, an A/D converter 119, a D/A converter 121 and a drive device 123.

A boot program and a basic input/output system (BIOS) etc. are stored in the ROM 112. A timer, a counter, flag information and other temporary data etc. are stored in the RAM 113. Note that the timer is updated at a predetermined period (1 ms, for example) by a timer function that is provided in an operating system (OS) that will be explained later. Further, a first storage portion 15A, a second storage portion 15B and a third storage portion 15C (refer to FIG. 2) are provided, as storage areas, in the RAM 113. The storage portion 114 is configured by a computer-readable non-transitory storage medium, such as a flash memory, for example. However, the storage portion 114 may be configured by a hard disk and/or a ROM etc. It is sufficient if the non-transitory storage medium is a storage medium that is able to store information irrespective of a period of storage of the information. The non-transitory storage medium need not necessarily include signals that are temporarily transferred. Application programs (hereinafter, simply referred to as "programs") that cause the CPU 111 to execute device-side first processing (refer to FIG. 4), device-side second processing (refer to FIG. 5), device-side third processing (refer to FIG. 6) and device-side fourth processing (refer to FIG. 7) are stored in the storage portion 114, along with the OS. Further, a table 1141 (refer to FIG. 10) and a table 1142 (refer to FIG. 8) are stored in the storage portion 114.

The display 116 is a liquid crystal display (LCD). The communication I/F 117 is an interface element (a Wi-Fi communication modem, for example) that is used by the communication device 15 to perform wireless communication by connecting with an access point (not shown in the drawings) that is connected to the network 20. The CPU 111 transmits and receives packets to and from the server 16, via the communication I/F 117. The input portion 118 includes physical buttons and/or a touch pad, for example. The touch pad is an electrostatic capacitance type position input device, for example, and outputs a signal that indicates a coordinate position corresponding to a contact position of a finger of a user. The touch pad may be configured by another type of position input device, such as a resistive membrane type device or an ultrasonic sensing device etc. A touch panel may be configured by superimposing the touch pad that is included in the input portion 118 on the display 116. The A/D converter 119 is electrically connected to a microphone 120, via an analog amplifier circuit (a microphone amplifier or the like) that is not shown in the drawings. The D/A converter 121 is electrically connected to a speaker 122, via an analog amplifier circuit (a speaker amplifier or the like) that is not shown in the drawings. The drive device 123 can read out information that is stored in a computer-readable storage medium 1231, such as a semi-conductor memory or the like. The CPU 111 can use the drive device 123 to read out a program that is stored in the storage medium 1231 and store the program in the storage portion 114.

Note that a general-purpose processor may be used as the CPU 111. The present disclosure should not be limited by a configuration that the device-side first processing to the device-side fourth processing are executed by the CPU 111. That is, the device-side first processing to the device-side fourth processing may be executed by another electronic device (an ASIC, for example). The device-side first processing to the device-side fourth processing may be performed as distributed processing by a plurality of electronic devices (that is, a plurality of CPUs). For example, a part of the device-side first processing to the device-side fourth processing may be executed by a server that is connected to the network 20. For example, the program may be downloaded from the server that is connected to the network 20 (namely, the program may be transmitted to the communication device 15 as a transmission signal), and may be stored in the storage portion 114 of the communication device 15. In this case, the program is stored in a non-transitory storage medium, such as an HDD, provided in the server. The communication I/F 117 may be an interface element (a LAN card, for example) that connects the communication device 15 to the network 20 by a wired connection.

An electrical configuration of the server 16 will be explained. The server 16 is provided with a CPU 161 that controls the server 16. The CPU 161 is electrically connected to a ROM 162, a RAM 163, a storage portion 164, a communication I/F 165 and a drive device 166. A boot program and a BIOS etc. are stored in the ROM 162. A timer, a counter and other temporary data are stored in the RAM 163. Programs that cause the CPU 161 to execute server-side first processing (refer to FIG. 12) and server-side second processing (refer to FIG. 13) are stored in the storage portion 164, along with an OS. The communication I/F 165 is an interface element (a LAN card, for example) that connects the server 16 to the network 20. The CPU 161 performs transmission and reception of data with the communication device 15, via the communication I/F 165. The drive device 166 can read out information that is stored in a storage medium 1661. The CPU 161 can use the drive device 166 to read out a program that is stored in the storage medium 1661 and store the program in the storage portion 164.

A flow of signals and data relating to sound in the teleconference system 1 will be explained with reference to FIG. 2. The microphone 120 collects sound, such as the voice etc., of the user using the communication device 15. The microphone 120 converts the collected sound to an analog electric signal and outputs the signal to the analog amplifier circuit that is not shown in the drawings. The analog amplifier circuit amplifies the input analog electric signal and outputs the amplified signal to the A/D converter 119. The A/D converter 119 samples the input analog electric signal at a predetermined sampling rate (44.1 kHz, for example) and converts the analog electric signal to a digital electric signal. The A/D converter 119 outputs the digital electric signal to the CPU 111. The CPU 111 converts the input digital electric signal to data and generates sampling data 151. The CPU 111 stores the generated sampling data 151 in the first storage portion 15A of the RAM 113. The sampling data 151 is stored in the first storage portion 15A in an order in which the sound is collected by the microphone 120.

The CPU 111 acquires the sampling data 151 stored in the first storage portion 15A in 20 ms chunks, in the order in which the sampling data 151 is stored in the first storage portion 15A, and compresses (e.g., encodes) the data in accordance with a specific compression system. Hereinafter, the compressed sampling data is referred to as compressed data and the compressed data of 20 ms is referred to as unit sound data. The CPU 111 stores generated unit sound data 152 in the second storage portion 15B of the RAM 113. When 20 ms or more of the sampling data 151 is stored in the first storage portion 15A, the CPU 111 repeats the processing to generate the unit sound data 152 and store the unit sound data in the second storage portion 15B.

Figure 2:
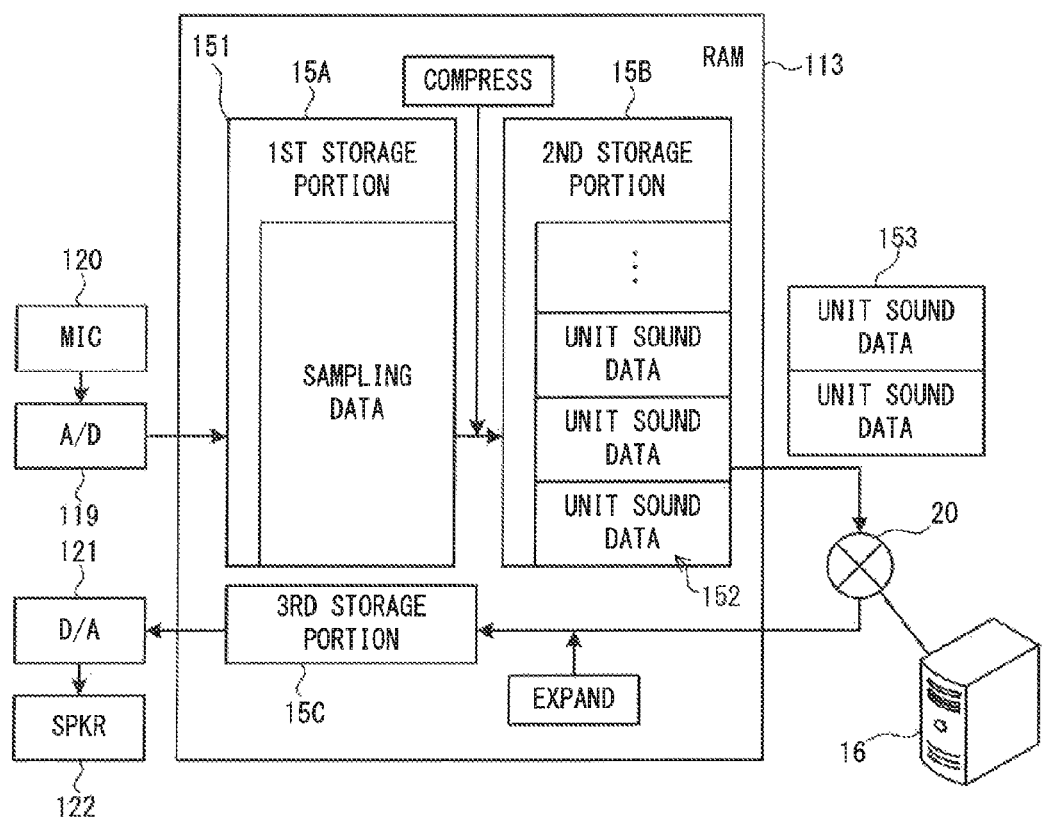
FIG. 2 is a diagram showing a flow of signals and data relating to sound in the teleconference system.

It should be noted that hereinafter, for ease of understanding, an explanation is made in which each of a plurality of 20 ms chunks of compressed data is stored in the second storage portion 15B as the unit sound data 152, as shown in FIG. 2. Here, in a state in which each of the plurality of 20 ms chunks of compressed data is stored in the second storage portion 15B, the compressed data may be aggregated without distinguishing between each of the chunks of data. In other words, in the second storage portion 15B, compressed data corresponding to the time 20 ms×N may be stored, where N (an integer of 1 or more) is a number of times that the unit sound data 152 has been generated.

The CPU 111 sets a combined time. The combined time indicates a time period of sound in sound data included in a communication packet 153. The communication packet 153 is transmitted from the communication device 15 to the other communication devices 15 participating in a teleconference. The communication packet 153 includes one or a plurality of the pieces of unit sound data 152. Further, the combined time indicates a transmission cycle when transmitting the communication packet 153. The combined time is set based on an extent of variations in a delay time from a time of transmission of a measurement packet to the server 16 to a time of reception of a measurement packet that is returned from the server 16. Hereinafter, the extent of variations in the delay time is referred to as jitter. The method of setting the combined time will be explained in detail later.

The CPU 111 generates the communication packet 153 that includes the compressed data corresponding to the combined time. Note that a number of pieces of the unit sound data 152 corresponding to the combined time are included in the generated communication packet 153. For example, when the combined time is set to 40 ms, the CPU 111 generates the communication packet 153 that includes two pieces of the unit sound data 152 (20 ms×2=40 ms). Note also that, while in FIG. 2 only the two pieces of unit sound data 152 are shown as the communication packet 153, in actuality, header information that is necessary to perform communication via the network 20 is added to the two pieces of unit sound data 152. In the above-described case, the CPU 111 transmits the generated communication packet 153 to the server 16 at a cycle corresponding to the set combined time, namely, every 40 ms.

It should be noted that the processing in which the digital electric signal output from the A/D converter 119 is converted to data and the sampling data 151 is generated, and then stored in the first storage portion 15A, and the processing in which the generated communication packet 153 is transmitted are executed by the CPU 111 as one function of the OS. On the other hand, the processing in which the sampling data 151 stored in the first storage portion 15A is compressed and the unit sound data 152 is generated, and the processing in which the communication packet 153 that includes at least one piece of the unit sound data 152 is generated are executed by the CPU 111 operating based on programs of the device-side first processing to the device-side fourth processing (refer to FIG. 4 to FIG. 10).

Figure 3:
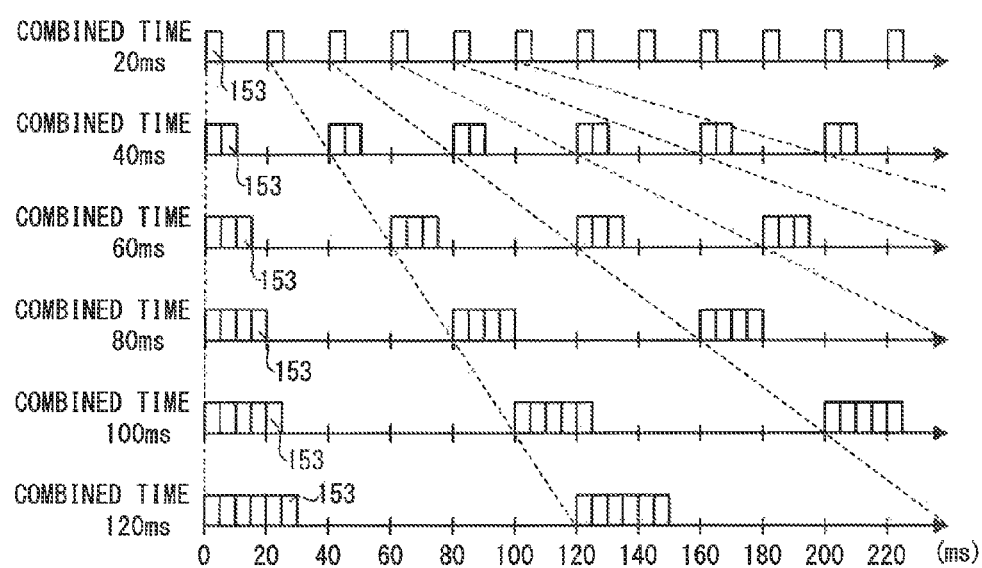
FIG. 3 is a diagram illustrating a transmission cycle.

As shown in FIG. 3, the CPU 111 changes the time period of the sound of the sound data included in the communication packet 153 and the transmission cycle of the communication packet 153, depending on the set combined time. When the combined time is 20 ms, the sound data corresponding to 20 ms (one piece of the unit sound data 152) is included in the communication packet 153 and the communication packet 153 is transmitted at a 20 ms cycle. Similarly, when the combined time is 40 ms, 60 ms, 80 ms, 100 ms and 120 ms, the sound data corresponding to 40 ms (two pieces of the unit sound data 152), 60 ms (three pieces of the unit sound data 152), 80 ms (four pieces of the unit sound data 152), 100 ms (five pieces of the unit sound data 152) and 120 ms (six pieces of the unit sound data 152) are respectively included in the communication packet 153, and the communication packet 153 is transmitted at a cycle of 40 ms, 60 ms, 80 ms, 100 ms and 120 ms, respectively. Note that, in the case of any of the combined times, the total amount of the unit sound data 152 that is transmitted from the communication device 15 to the other communication devices 15 does not change.

The longer the transmission cycle of the communication data transmitted from the communication device 15, the lower the jitter. Jitter arises due to variations in the time needed for the processing to perform communication of the communication packet 153 between the communication device 15, the server 16 and relay devices not shown in the drawings (a router, a server etc.) that are located in the network 20. As a result, the longer the transmission cycle of the communication data, the lower the frequency of the processing needed to perform the communication of the communication packet 153, and the lower the jitter that is caused by variations in the processing time. On the other hand, the longer the transmission cycle of the communication data, the larger the delay time of the sound data, and it is therefore preferable to have as small a transmission cycle as possible. Therefore, in order for the teleconference to be performed smoothly between the users, the communication device 15 sets the appropriate combined time depending on a communication state of the network 20. This will be explained in more detail later.

As shown in FIG. 2, the CPU 161 of the server 16 receives the communication packet 153 transmitted from the communication device 15 via the network 20. The CPU 161 identifies the teleconference in which the communication device 15 that has sent the communication packet 153 is participating, and identifies the other communication devices 15 that are participating in the teleconference. The CPU 161 relays the received communication packet 153 to the other identified communication devices 15.

When the CPU 111 of the communication device 15 has received the communication packet 153 from the server 16 via the network 20, the CPU 111 acquires a number of pieces (that correspond to the combined time) of the unit sound data 152 included in the received communication packet 153. The CPU 111 expands (decodes) the acquired unit sound packet and restores it to the original sampling data. The CPU 111 stores the sampling data in the third storage portion 15C of the RAM 113. The CPU 111 acquires the sampling data stored in the third storage portion 15C in chunks of 20 ms, in the order in which the sound was collected by the microphone 120. The CPU 111 outputs, to the D/A converter 121, a digital electric signal corresponding to the acquired sampling data. The D/A converter 121 converts the input digital electric signal to an analog electric signal. The D/A converter 121 outputs the analog electric signal to the analog amplifier circuit that is not shown in the drawings. The analog amplifier circuit amplifies the input analog electric signal and outputs the amplified signal to the speaker 122. The speaker 122 outputs sound corresponding to the input analog electric signal.

Note that the processing in which the packet is received, and the processing in which the digital electric signal corresponding to the sampling data stored in the third storage portion 15C is output to the D/A converter 121 are executed by the CPU 111 as one function of the OS. On the other hand, the processing in which the at least one piece of unit sound data 152 included in the received packet is expanded and restored to the original sampling data and is stored in the third storage portion 15C is executed by the CPU 111 operating based on programs that execute processing that is not shown in the drawings.

By the above-described processing being executed, it is possible for spoken communication to be performed between the users of the communication devices 15 participating in the teleconference. It should be noted that only the flow of the signals and the data relating to sound has been explained above, but in actuality, packets including data of shared document and video that are displayed on the display portions 116 of the communication devices 15 are also transmitted and received between the communication devices 15 participating in the teleconference, via the server 16. The shared document includes explanatory materials etc. relating to the teleconference, to which each of the users refers during the teleconference. The video includes video showing a situation of the user etc. that is captured by the camera 115. Each of the users of each of the communication devices 15 can perform the teleconference with the other users of the other communication devices 15 using the shared document and video displayed on the display 116 and using the sound output from the speaker 122.

The device-side first processing to the device-side fourth processing executed by the CPU 111 of the communication device 15 will be explained with reference to FIG. 5 to FIG. 10. The device-side first processing is started by the CPU 111 executing a program stored in the storage portion 114 when an operation to activate the teleconference application is input via the input portion 118. The device-side second processing to the device-side fourth processing are started by processing at step S13 (to be explained later) of the device-side first processing. The device-side first processing to the device-side fourth processing are executed in parallel.

Note that, in the following explanation, a specific explanation is made of an example of a case in which each of the users of the communication devices 11 to 13 participates in a common teleconference, and the device-side first processing to the device-side fourth processing are performed by the CPU 111 of the communication device 11. For example, before a scheduled date and time for the teleconference, an electronic mail is transmitted from the server 16 to each of electronic mail addresses corresponding to the communication devices 11 to 13 that are to participate in the teleconference. The electronic mail includes a uniform resource locator (URL) for the teleconference by the communication devices 11 to 13. This URL is unique to each conference room of the teleconference. In other words, an ID (a conference ID) that identifies the teleconference is included in the URL.

When the example of the communication device 11 is given, the user of the communication device 11 operates the communication device 11 at the scheduled date and time of the teleconference. In the communication device 11, the CPU 111 determines whether or not the input portion 118 has detected an input corresponding to the URL that includes the conference ID (step S11). When the input corresponding to the URL that includes the conference ID has not been detected (no at step S11), the CPU 111 returns the processing to step S11. When the input corresponding to the URL that includes the conference ID has been detected (yes at step S11), the CPU 111 accesses the server 16 via the communication I/F 117, and performs conference connection processing. As a result of the conference connection processing, a teleconference session is established between the communication device 11 and the server 16, and a teleconference connection is established between the communication device 11 and the server 16. A similar operation is performed on each of the communication devices 12 and 13. In this manner, the teleconference session is established between the server 16 and each of the communication devices 12 and 13, and the teleconference connection is established between the server 16 and each of the communication devices 12 and 13.

The CPU 161 of the server 16 associates the conference ID included in the URL with an ID (a device ID) that identifies each of the communication devices 11 to 13 and stores the associated IDs as a management table in the storage portion 164. The teleconference between the communication devices 11 to 13 is started in this way.

The CPU 111 starts processing that converts a digital electric signal output from the A/D converter 119 to data, generates sampling data and stores the sampling data in the first storage portion 15A. Note that this processing is executed as a function of the OS and is performed in parallel with the device-side first processing. The CPU 111 starts the device-side second processing (refer to FIG. 5), the device-side third processing (refer to FIG. 6) and the device-side fourth processing (refer to FIG. 7) (step S13).

Figure 5:
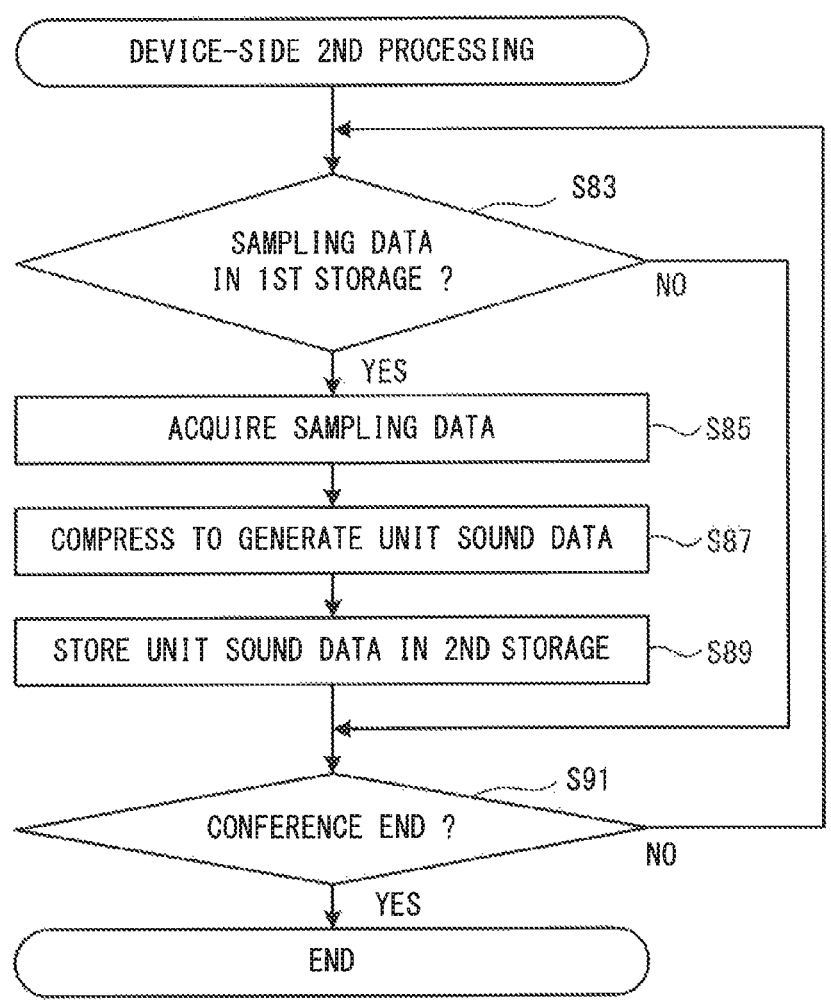
FIG. 5 is a flowchart of device-side second processing.

The device-side second processing will be explained with reference to FIG. 5. The CPU 111 determines whether or not sampling data corresponding to a time period equal to 20 ms or more is stored in the first storage portion 15A (step S83). When it is determined that the sampling data corresponding to 20 ms or more is not stored in the first storage portion 15A (no at step S83), the CPU 111 advances the processing to step S91. When it is determined that the sampling data corresponding to 20 ms or more is stored in the first storage portion 15A (yes at step S83), the CPU 111 acquires 20 ms chunks of the sampling data in the order in which the sampling data is stored in the first storage portion 15A (step S85). When the CPU 111 has acquired 20 ms of the sampling data, the CPU 111 deletes the acquired sampling data from the first storage portion 15A in order to secure the storage capacity of the first storage portion 15A.

Note that the CPU 111 continuously performs the processing in which the sampling data is generated and stored in the first storage portion 15A as a function of the OS. Thus, a cycle at which the CPU 111 acquires 20 ms of the sampling data from the first storage portion 15A by the processing at step S85 is substantially the same as the 20 ms cycle at which 20 ms of the sampling data is newly stored in the first storage portion 15A.

The CPU 111 compresses the acquired 20 ms of sampling data and generates the unit sound data 152 (step S87). The CPU 111 stores the generated unit sound data 152 in the second storage portion 15B (step S89). As described above, as the sampling data is acquired from the first storage portion 15A at the cycle of 20 ms, a cycle at which the generated unit sound data 152 is stored in the second storage portion 15B is also approximately 20 ms.

The CPU 111 determines whether or not an input operation to end the teleconference has been detected via the input portion 118 (step S91). When it is determined that the input operation to end the teleconference has not been detected (no at step S91), the CPU 111 returns the processing to step S83. When it is determined that the input operation to end the teleconference has been detected (yes at step S91), the CPU 111 ends the device-side second processing.

The device-side third processing will be explained with reference to FIG. 6. The CPU 111 determines whether or not a transmission timing to transmit a measurement packet to the server 16 has been reached, where the measurement packet is transmitted to the server 16 at a constant cycle T1 (1 s, for example) (step S101). When it is determined that the transmission timing of the measurement packet has not been reached (no at step S101), the CPU 111 advances the processing to step S123. When it is determined that the transmission timing of the measurement packet has been reached (yes at step S101), the CPU 111 acquires from the OS a time t1, which is a point in time at which it is determined that the transmission timing has been reached, and stores the time t1 in the RAM 113 (step S103). The CPU 111 transmits the measurement packet to the server 16 (step S105). The measurement packet is a packet that can be transmitted via the network 20, and includes dummy data of a predetermined size.

The CPU 111 determines whether or not the measurement packet that is returned from the server 16 in response to the transmission of the measurement packet has been received (step S107). When it is determined that the measurement packet has not been received (no at step S107), the CPU 111 returns the processing to step S107. When it is determined that the measurement packet returned from the server 16 has been received (yes at step S107), the CPU 111 acquires from the OS a time t2, which is a point in time at which it is determined that the measurement packet has been received, and stores the time t2 in the RAM 113 (step S109). The CPU 111 acquires the time t1 and the time t2 stored in the RAM 113. The CPU 111 calculates the elapsed time from the time t1 to the time t2 as the delay time, and stores the delay time in the RAM 113 (step S111). The delay time is a turnaround time obtained by adding a communication time taken for the measurement packet transmitted from the communication device 11 to arrive at the server 16 to a communication time taken for the measurement packet transmitted from the server 16 to arrive at the communication device 11. It should be noted that, in place of the dedicated measurement packets, the processing at step S105 and at step S107 may be achieved by a PING command, which is provided as standard in the OS and is operated in accordance with an internet control message protocol (ICMP).

The CPU 111 determines whether or not a cycle T2 (10 s, for example), which is longer than the cycle T1 at which the measurement packet is transmitted, has elapsed from when a jitter value is finally calculated by processing at step S117 and step S119 that will be explained later (step S115). When it is determined that the cycle T2 has not elapsed from when the jitter value is finally calculated (no at step S115), the CPU 111 advances the processing to step S123.

When the cycle T2 has elapsed from when the jitter value is finally calculated, a plurality of delay times that have not been used when calculating a standard deviation by the processing at step S117 (to be explained later) are stored in the RAM 113. When it is determined that the cycle T2 has elapsed from when the jitter value is finally calculated (yes at step S115), the CPU 111 uses the plurality of delay times stored in the RAM 113 to calculate an average value and then uses the calculated average value to calculate a standard deviation σ (step S117). The CPU 111 deletes the delay times used to calculate the standard deviation σ from the RAM 113. The CPU 111 calculates 3σ as the jitter value (step S119). The CPU 111 transmits a first notification packet, which includes the device ID of the communication device 11 and the calculated jitter value, to the server 16 (step S121).

Note that the method of calculating the standard deviation σ need not necessarily be limited to the above-described method. For example, the CPU 111 may use a RAM 113 as a ring buffer. The CPU 111 may store the calculated delay times in order in the ring buffer (step S111). Of the plurality of delay times stored in the ring buffer, the CPU 111 may acquire a predetermined number of the delay times in order from a most recent storage timing. The CPU 111 may calculate the standard deviation a using the acquired predetermined number of delay times. It should be noted that, when the ring buffer is used, the CPU 111 does not delete, from the ring buffer, the delay times acquired to calculate the standard deviation σ. In this manner, the CPU 111 can calculate the standard deviation σ using a number of the delay times that is larger than the number of delay times calculated during the cycle T2.

The CPU 111 determines whether or not the input operation to end the teleconference has been detected via the input portion 118 (step S123). When it is determined that the input operation to end the teleconference has not been detected (no at step S123), the CPU 111 returns the processing to step S101. When it is determined that the input operation to end the teleconference has been detected (yes at step S123), the CPU 111 ends the device-side third processing.

The device-side fourth processing will be explained with reference to FIG. 7. The CPU 111 determines whether or not a second notification packet transmitted from the server 16 has been received (step S131). When it is determined that the second notification packet has not been received (no at step S131), the CPU 111 advances the processing to step S137. When it is determined that the second notification packet has been received (yes at step S131), the CPU 111 acquires the device ID and the jitter value that are included in the second notification packet. The CPU 111 associates the acquired device ID and the jitter value and stores the associated data in the table 1142 that is stored in the storage portion 114 (step S135).

The table 1142 will be explained with reference to FIG. 8. The table 1142 includes the device ID, the jitter value and a jitter value for comparison. The device ID and the jitter value respectively correspond to the device ID and the jitter value included in the second notification packet. The jitter value for comparison is used when jitter values are compared at step S17 to be explained later (refer to FIG. 4).

Figure 6:
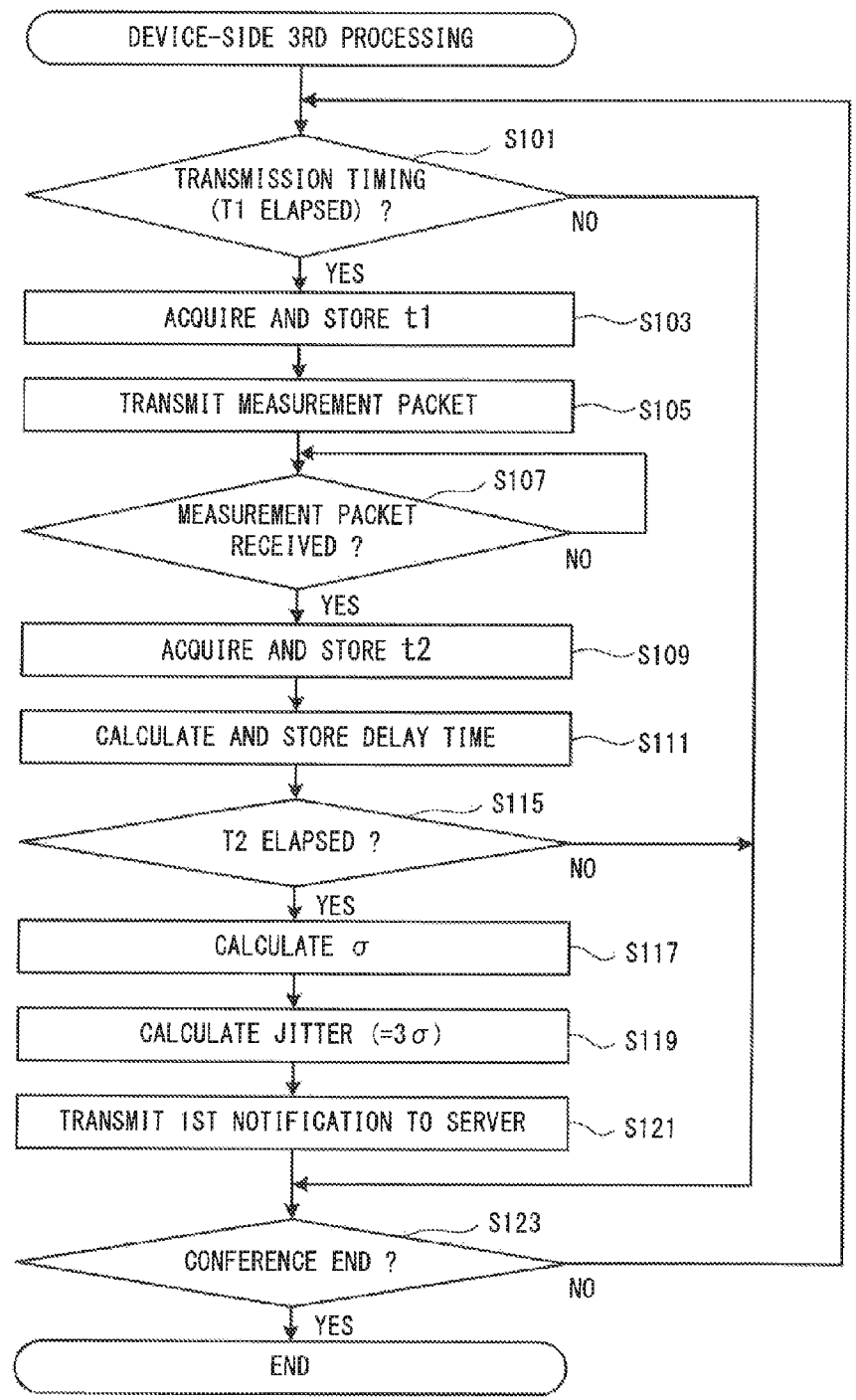
FIG. 6 is a flowchart of device-side third processing.

For example, as the communication devices 11 to 13 are participating in the same teleconference, the CPU 111 of each of the communication devices 11 to 13 performs the device-side third processing (refer to FIG. 6) and the first notification packets are thus transmitted to the server 16 (step S121, refer to FIG. 6). As will be explained in more detail later, when the server 16 has received the first notification packet from each of the communication devices 11 to 13, the server 16 transmits, to each of the communication devices 11 to 13, the second notification packet that includes the device ID and the jitter value included in each of the first notification packets. As a result, the device ID and the jitter value of each of all the communication devices 11 to 13 participating in the teleconference are stored in the table 1142 in association with each other. Note that there are cases in which the device ID that is newly stored in the table 1142 by the processing at step S135 (refer to FIG. 7) is already stored in the table 1142. In this case, the CPU 111 stores the jitter value that is associated with the already stored device ID as the jitter value for comparison in the table 1142. Next, the CPU 111 stores the jitter value to be newly stored in the table 1142 in association with the device ID to be newly stored. In other words, the already stored jitter value is updated by the newly stored jitter value. For example, the jitter value associated with the device ID 11 is 10 ms and the jitter value for comparison is 30 ms. This indicates that the value of the jitter measured by the communication device 11 (the device ID 11) performing the device-side third processing (refer to FIG. 6) has been changed from 30 ms to 10 ms.

Figure 7:
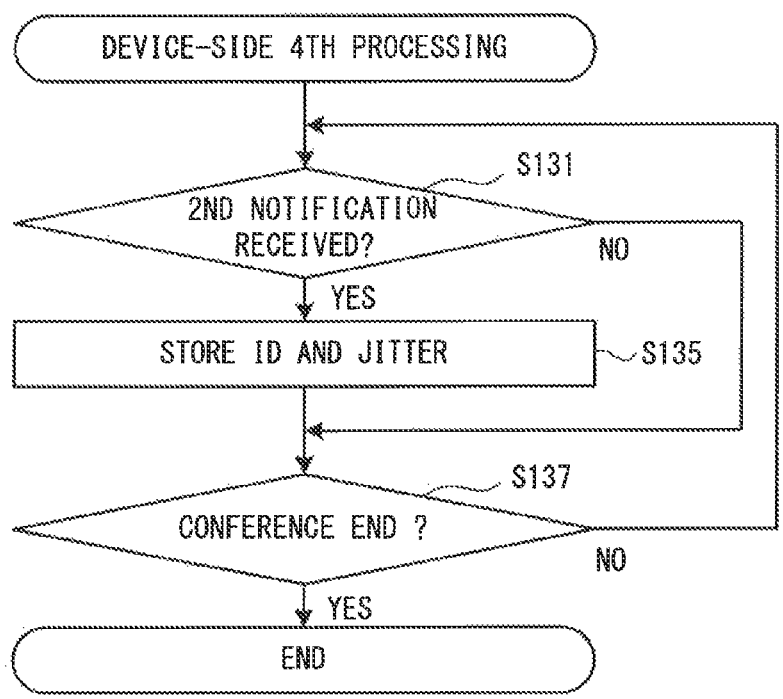
FIG. 7 is a flowchart of device-side fourth processing.

As shown in FIG. 7, the CPU 111 determines whether or not the input operation to end the teleconference has been detected via the input portion 118 (step S137). When it is determined that the input operation to end the teleconference has not been detected (no at step S137), the CPU 111 returns the processing to step S131. When it is determined that the input operation to end the teleconference has been detected (yes at step S137), the CPU 111 ends the device-side fourth processing.

Figure 4:
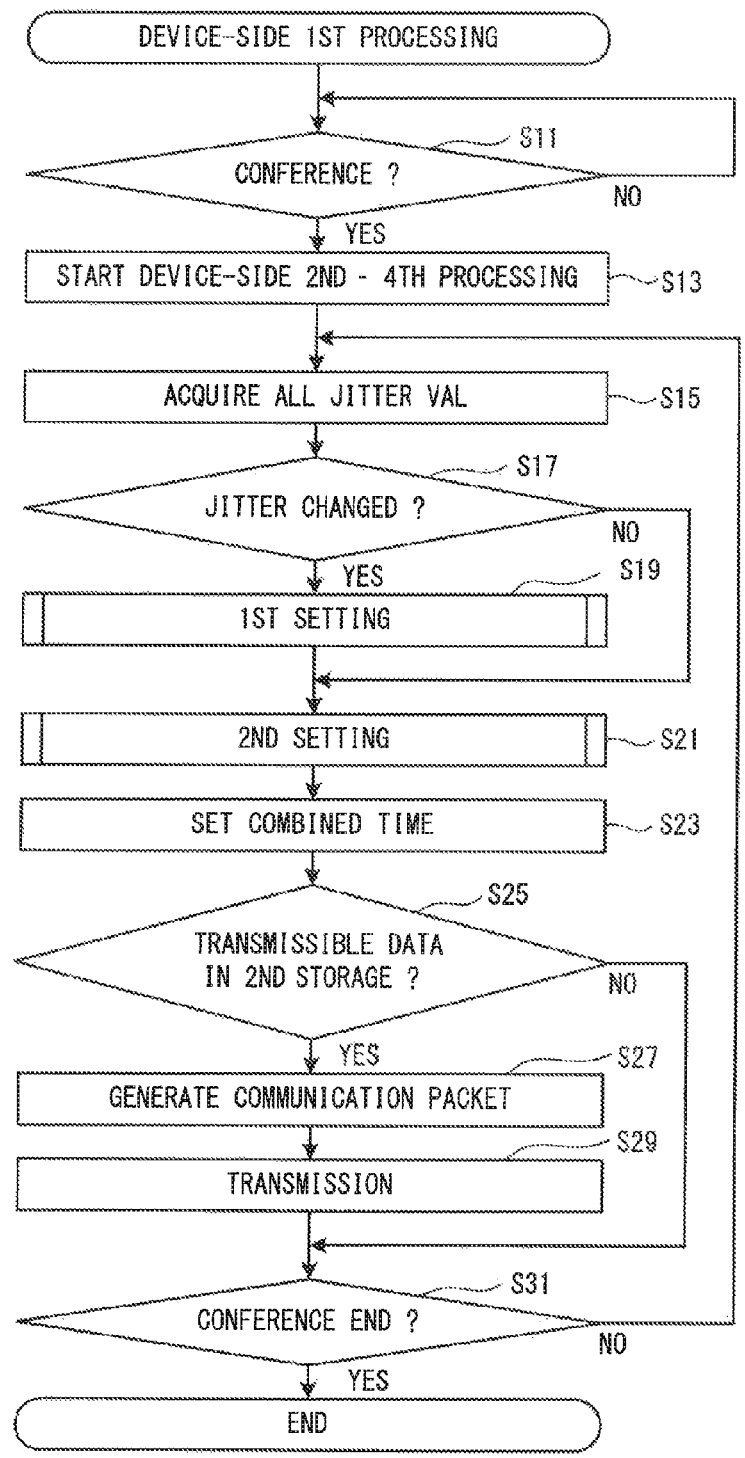
FIG. 4 is a flowchart of device-side first processing.

As shown in FIG. 4, after the CPU 111 starts the device-side second processing (refer to FIG. 5), the device-side third processing (refer to FIG. 6) and the device-side fourth processing (refer to FIG. 7) by the processing at step S13, the CPU 111 acquires all the jitter values and the jitter values for comparison stored in the table 1142 (refer to FIG. 8) stored in the storage portion 114 (step S15). The CPU 111 calculates a difference between the associated jitter value and the jitter value for comparison for each of the device IDs stored in the table 1142. When at least one of the calculated differences is not zero, the CPU 111 determines that at least one of the jitter values has been changed (yes at step S17). The CPU 111 performs processing (first setting processing, refer to FIG. 9) that sets a first provisional time based on the jitter value stored in the table 1142 (step S19). The first provisional time is a candidate when a final combined time is set by processing at step S23 that will be explained later. After the CPU 111 ends the first setting processing, the CPU 111 advances the processing to step S21. Meanwhile, when all of the plurality of calculated differences are zero, the CPU 111 determines that none of the jitter values have been changed (no at step S17). The CPU 111 advances the processing to step S21.

It should be noted that, in the above explanation, the CPU 111 may compare each of the plurality of calculated differences with a predetermined threshold value (10 ms, for example). In this case, the CPU 111 may determine that at least one of the jitter values has been changed when at least one of the calculated differences is larger than the predetermined threshold value. Meanwhile, the CPU 111 may determine that none of the jitter values have been changed when none of the calculated differences are larger than the predetermined threshold value.

The first setting processing will be explained with reference to FIG. 9. The CPU 111 refers to the table 1142 (refer to FIG. 8) and acquires the jitter value that is associated with the device ID of the communication device 11 (step S41). The CPU 111 refers to the table 1142 and acquires the jitter value associated with the device ID of one of either the communication device 12 or the communication device 13 (in accordance with an order in which the device IDs are arranged, or an order in which the device IDs are stored in the table 1142, for example) (step S43). Based on the two jitter values acquired by the processing at step S41 and step S43, the CPU 111 calculates a combined jitter value. The combined jitter value is calculated, for example, as a square root of a value obtained by squaring and adding each of the two jitter values (step S45). Hereinafter, the calculated value is referred to as combined jitter or as a combined jitter value. The CPU 111 stores the combined jitter value in the RAM 113 (step S45). The CPU 111 determines whether or not the jitter values associated with all the device IDs of the participants in the teleconference have been acquired by the processing at step S43 (step S47). When it is determined that the jitter values associated with all of the device IDs have not been acquired (no at step S47), the CPU 111 returns the processing to step S43. Among the plurality of jitter values associated with the device IDs 12 and 13, the CPU 111 acquires the jitter value associated with another device ID that has not been acquired in the processing at step S43 (step S43), in an order in which the device IDs are arranged, or in accordance with a storage order in the table 1142, for example. The CPU 111 then repeats the processing at step S45. When it is determined that the jitter values associated with all the device IDs have been acquired at step S43 (yes at step S47), the CPU 111 advances the processing to step S49.

Among the combined jitter values stored in the RAM 113 by the processing at step S45, the CPU 111 selects the largest combined jitter value (hereinafter referred to as largest jitter or largest jitter value) (step S49). The CPU 111 determines a communication state of the network 20 by applying the selected largest jitter value to the table 1141 (refer to FIG. 10) (step S50). For example, as the communication state, the CPU 111 determines which range the selected largest jitter value belongs to, among a plurality of jitter ranges registered in the table 1141. Based on the table 1141, the CPU 111 sets the first provisional time that corresponds to the determined communication state (step S51). The CPU 111 stores the set first provisional time in the RAM 113. The CPU 111 ends the first setting processing and returns the processing to the device-side first processing (refer to FIG. 4).

A method of determining the communication state of the network 20 and a method of setting the first provisional time will be explained with reference to the table 1141 shown in FIG. 10. In the table 1141, a single combined amount and a single first provisional time are associated with each of the plurality of jitter ranges that indicate the range of the largest jitter. The combined amount indicates a number of the pieces of unit sound data 152. The time of the sound of the unit sound data 152 is 20 ms, and therefore, the first provisional times 20 ms (=20 ms×1), 40 ms (=20 ms×2), 60 ms (=20 ms×3), 80 ms (=20 ms×4), 100 ms (=20 ms×5) and 120 ms (=20 ms×6) are associated with the combined amounts 1, 2, 3, 4, 5 and 6, respectively.

Figure 9:
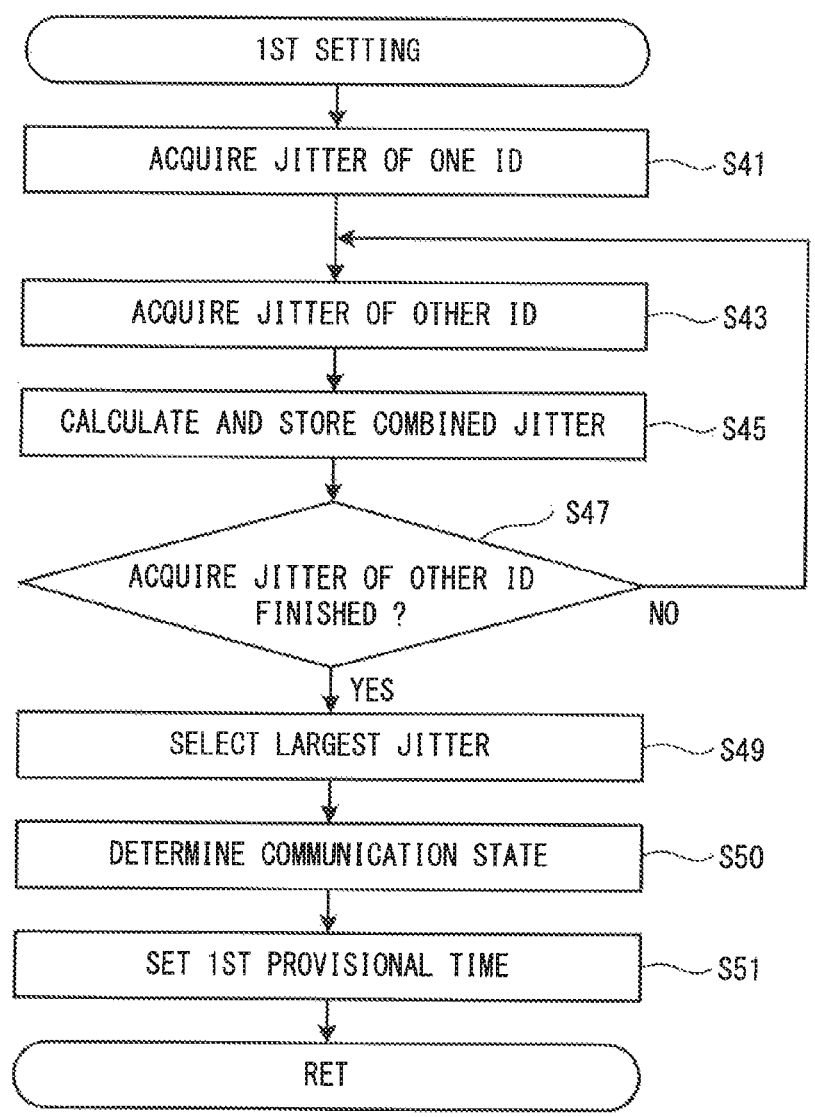
FIG. 9 is a flowchart of first setting processing.

Of the plurality of jitter ranges of the table 1141, the CPU 111 identifies the jitter range that includes the largest jitter value selected by the processing at step S49 (refer to FIG. 9). When the identified jitter range is equal to or less than 50 ms, the CPU 111 determines the communication state of the network 20 to be a first state (step S50, refer to FIG. 9). The first state indicates a state of the network 20 that is stable in comparison to a second state that will be explained later. Thus, the first provisional times are set to the combined times that are equal to or less than 100 ms (20 to 100 ms) that correspond to each of the jitter ranges (step S51, refer to FIG. 9). On the other hand, when the identified jitter range is larger than 50 ms, the CPU 111 determines the state of the network 20 to be the second state (step S50). The second state indicates a state of the network 20 that is unstable in comparison to the first state described above. Thus, the first provisional time is set to the maximum combined time of 120 ms in the table 1141 (step S51).

Note that in the present embodiment, an example is shown in which, the first state and the second state are determined in accordance with the largest jitter value when the threshold value is 50 ms. However, the present disclosure is not limited to the case in which the threshold value is 50 ms. The threshold value that is used when determining the first state and the second state may be a selected value. For example, the threshold value may be any one of 10 ms, 20 ms, 30 ms and 40 ms, which are the respective lower limit values of each of the plurality of jitter ranges in the table 1141. For example, when the threshold value is 40 ms, the first state may be determined when the largest jitter value is equal to or less than 40 ms (step S50), and the first provisional times corresponding to each of the jitter ranges equal to or less than 40 ms may be set (step S51). On the other hand, the second state may be determined when the largest jitter value is larger than 40 ms (step S50), and the first provisional time may be set to 100 ms.

As shown in FIG. 4, the CPU 111 performs processing (second setting processing, refer to FIG. 11) that sets a second provisional time based on a category of data included in the communication packet 153 that is transmitted during the teleconference (step S21). Similarly to the first provisional time that is set by the first setting processing (refer to FIG. 9), the second provisional time is a candidate when the combined time is finally set by processing at step S23 that will be explained later.

Figure 11:
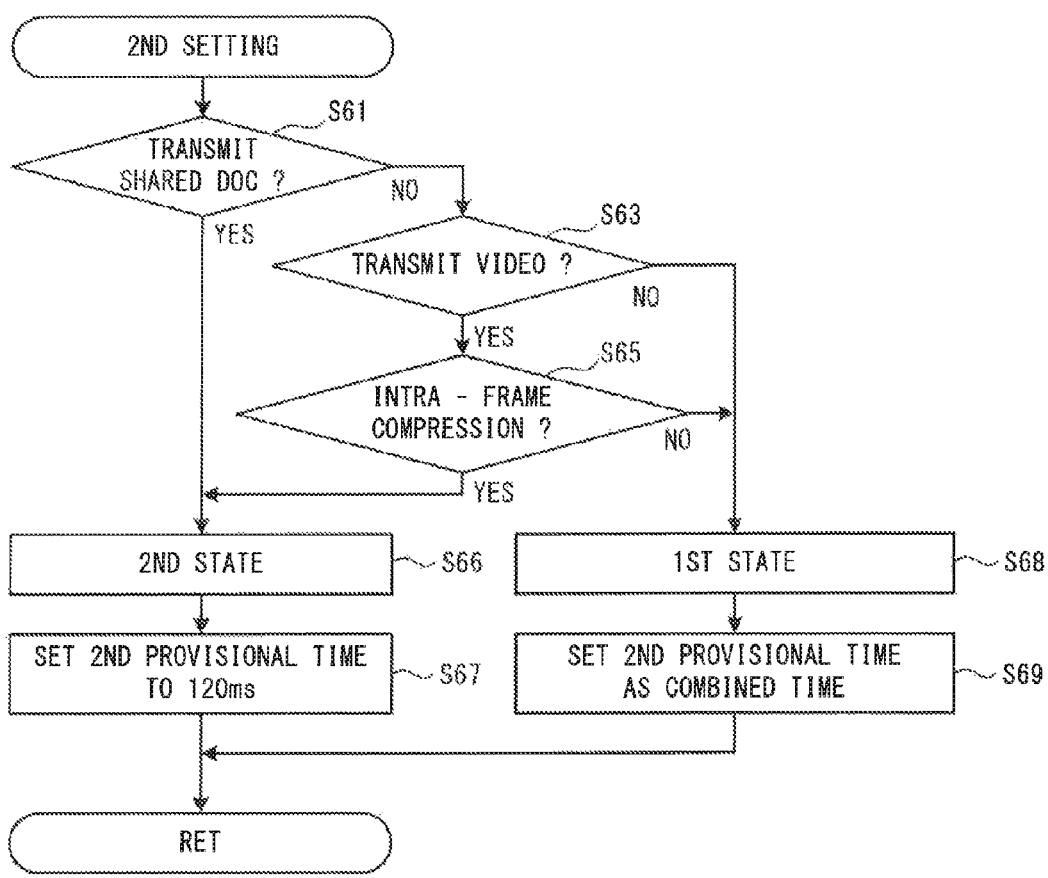
FIG. 11 is a flowchart of second setting processing.

The second setting processing will be explained with reference to FIG. 11. The CPU 111 determines whether or not an operation to share the shared document between the communication device 11 and the communication devices 12 and 13 that are participating in the teleconference has been detected via the input portion 118 (step S61). When it is determined that the operation to share the shared document has been detected, the CPU 111 transmits a shared document packet, which includes data of the shared document, to the server 16. Note that when the CPU 161 of the server 16 receives the shared document packet that is transmitted from the communication device 11, the CPU 161 identifies the conference ID of the teleconference in which the communication device 11 that has transmitted the shared document packet is participating, based on a management table. The CPU 161 identifies, as the device IDs of the communication devices 11, 12 and 13 that are participating in the shared teleconference, the device IDs 11, 12 and 13 that are associated with the same conference ID as the conference ID identified in the management table. Among the identified device IDs 11, 12 and 13, the CPU 161 transmits the received shared document packet to the communication devices 12 and 13 that have the device IDs 12 and 13 other than the device ID 11 of the communication device 11, which has originally transmitted the shared document packet. When the CPU 111 of each of the communication devices 12 and 13 receives the shared document packet transmitted from the server 16, the CPU 111 displays the shared document on the display 116, based on data of the shared document included in the received shared document packet.

Further, when the CPU 111 of the communication device 11 detects the operation to share the shared document, the transmission of the shared document packet is started and thus the CPU 111 of the communication device 11 determines that a state is obtained in which the shared document packet is being transmitted (yes at step S61). The CPU 111 determines the communication state of the network 20 to be the second state (step S66). This is because the size of the shared document data included in the shared document packet is larger than the size of the data included in the other communication packets 153, and when the shared document packet is transmitted, there is a high possibility that the state of the network 20 may become unstable. The CPU 111 sets the second provisional time to 120 ms, which is the maximum combined time in the table 1141 (refer to FIG. 10) (step S67). The CPU 111 stores the set second provisional time in the RAM 113. The CPU 111 ends the second setting processing and returns the processing to the device-side first processing (refer to FIG. 4).

When the CPU 111 does not detect the operation to share the shared document data, the CPU 111 determines that a state is obtained in which the shared document packet is not being transmitted (no at step S61). Next, the CPU 111 refers to the RAM 113 and determines whether or not a setting is stored that allows the server 16 to transmit the video captured by the camera 115 to the communication devices 12 and 13 (step S63). Note that that the settings that allow or prohibit the server 16 from transmitting the video captured by the camera 115 to the communication devices 12 and 13 are received via the input portion 118 and stored in the RAM 113. When it is determined that an operation to allow the server 16 to transmit the video to the communication devices 12 and 13 has been detected, the CPU 111 compresses data of the video captured by the camera 115 and sequentially generates frames of video that is compressed using intra-frame compression and frames of video that is compressed using inter-frame compression. The frame of video compressed using intra-frame compression includes data in which only video data inside a frame is compressed. The frame of video compressed using inter-frame compression includes data of a difference between previous and following frames. Hereinafter, the video compressed using intra-frame compression is referred to as intra-frame compressed video and the video compressed using inter-frame compression is referred to as inter-frame compressed video. A compression ratio when generating the inter-frame compressed video is larger than a compression ratio when generating the intra-frame compressed video, and thus, the size of the intra-frame compressed video is larger than the size of the inter-frame compressed video.

The CPU 111 generates the intra-frame compressed video or the inter-frame compressed video. The CPU 111 generates a video packet that includes a type of the video as a header and transmits the video packet to the server 16. Note that when the CPU 161 of the server 16 receives the video packet transmitted from the communication device 11, the CPU 161 identifies the conference ID of the teleconference in which the communication device 11 is participating, based on the management table. The CPU 161 identifies, as the device IDs of the communication devices 11, 12 and 13 participating in the shared teleconference, the device IDs 11, 12 and 13 that are associated with the same conference ID as the conference ID identified in the management table. Of the identified device IDs 11, 12 and 13, the CPU 161 transmits the received video packet to the communication devices 12 and 13 that have the device IDs 12 and 13 other than the device ID 11 of the communication device 11, which has originally transmitted the video packet. When the CPU 111 of each of the communication devices 12 and 13 receives the video packet transmitted from the server 16, the CPU 111 displays the video captured by the camera 115 on the display 116, based on the data of the intra-frame compressed video or of the inter-frame compressed video included in the received video packet.

In addition, when the setting that allows the transmission from the server 16 to the communication devices 12 and 13 is stored, the transmission of the video packet is started, and thus the CPU 111 of the communication device 11 determines that a state is obtained in which the video packet is being transmitted (yes at step S63). The CPU 111 acquires, from the header of the video packet, the type of the video (the intra-frame compressed video or the inter-frame compressed video) included in the video packet being transmitted. The CPU 111 determines whether or not the acquired type is the intra-frame compressed video (step S65). When the CPU 111 determines that the acquired type is the intra-frame compressed video (yes at step S65), the CPU 111 determines the communication state of the network 20 to be the second state (step S66). This is because the size of the intra-frame compressed video is larger than the size of data included in the other communication packets 153, and when the video packet including the intra-frame compressed video data is transmitted, there is a high possibility that the state of the network 20 may become unstable. The CPU 111 sets the second provisional time to 120 ms, which is the maximum combined time in the table 1141 (step S67). The CPU 111 stores the set second provisional time in the RAM 113. The CPU 111 ends the second setting processing and returns the processing to the device-side first processing (refer to FIG. 4).

On the other hand, when the CPU 111 determines that the video packet is not being transmitted (no at step S63), or determines that the type of the video acquired from the OS is the inter-frame compressed video (no at step S65), the CPU 111 determines the communication state of the network 20 to be the first state (step S68). This is because when neither the shared document packet nor the video packet is being transmitted, or when the video packet that includes the inter-frame compressed video data is being transmitted, the size of the data being transmitted is smaller than the size of the data of the shared document packet or the video packet that includes the intra-frame compressed video data, and thus there is a high possibility that the state of the network 20 is stable. The CPU 111 reads, from the RAM 113, the combined time that is repeatedly set by the processing at step S23 (refer to FIG. 4) that will be explained later, and sets the read combined time as the second provisional time (step S69). The CPU 111 stores the set second provisional time in the RAM 113. The CPU 111 ends the second setting processing and returns the processing to the device-side first processing (refer to FIG. 4).

As shown in FIG. 4, after the second setting processing (step S21) is ended, the CPU 111 reads the first provisional time set by the first setting processing (step S19) and the second provisional time set by the second setting processing (step S21) from the RAM 113. Of the read first provisional and second provisional times, the CPU 111 finally sets the largest value as the combined time (step S23). The CPU 111 stores the set combined time in the RAM 113. It should be noted that when the first setting processing is not performed (when it is no at step S17), the second provisional time stored in the RAM 113 is finally set as the combined time.

The CPU 111 determines whether or not the unit sound data 152 corresponding to the combined time stored in the RAM 113 is stored in the second storage portion 15B (refer to FIG. 2) (step S25). When it is determined that the unit sound data 152 corresponding to the combined time is not stored in the second storage portion 15B (no at step S25), the CPU 111 advances the processing to step S31. When it is determined that the unit sound data 152 corresponding to the combined time is stored in the second storage portion 15B (yes at step S25), the CPU 111 generates the communication packet 153 that includes the unit sound data 152 corresponding to the combined time (step S27). Specifically, the CPU 111 generates the communication packet 153 that includes a piece of the unit sound data 152 when the combined time set by the processing at step S23 is 20 ms. Similarly, the CPU 111 generates the communication packet 153 that includes two pieces of the unit sound data 152 when the combined time is 40 ms, the communication packet 153 that includes three pieces of the unit sound data 152 when the combined time is 60 ms, the communication packet 153 that includes four pieces of the unit sound data 152 when the combined time is 80 ms, the communication packet 153 that includes five pieces of the unit sound data 152 when the combined time is 100 ms, and the communication packet 153 that includes six pieces of the unit sound data 152 when the combined time is 120 ms. The CPU 111 transmits the generated communication packet 153 to the server 16 via the network 20 (step S29). Note that when the server 16 receives the communication packet 153 transmitted from the communication device 11, the server 16 transmits the communication packet 153 to the communication devices 12 and 13. Thus, by the processing at step S29, the CPU 111 transmits the communication packet 153 to the communication devices 12 and 13 via the server 16.

It should be noted that the CPU 111 generates the unit sound data 152 corresponding to 20 ms×N at a 20 ms×N cycle, and stores the generated unit sound data 152 in the second storage portion 15B. Thus, when the CPU 111 sets the combined time to 20 ms×N and determines that the unit sound data 152 corresponding to 20 ms×N are stored in the second storage portion 15B (yes at step S25), the cycle is also set to 20 ms×N, which is a time period during which the sampling data corresponding to 20 ms×N are stored in the first storage portion 15A. As a result, the CPU 111 transmits the communication packet 153 generated at step S27 to the server 16 at a cycle corresponding to the combined time.

The CPU 111 determines whether or not an input operation to end the teleconference has been detected via the input portion 118 (step S31). When it is determined that the input operation to end the teleconference has not been detected (no at step S31), the CPU 111 returns the processing to step S15. When it is determined that the input operation to end the teleconference has been detected (yes at step S31), the CPU 111 ends the device-side first processing.

Figure 12:
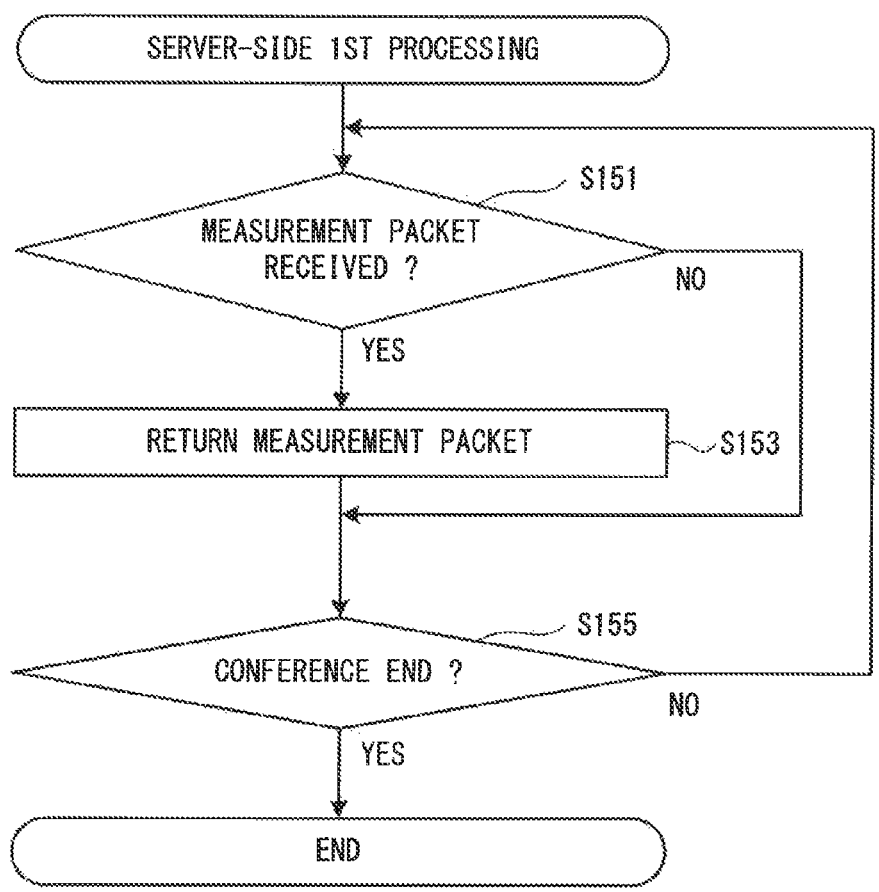
FIG. 12 is a flowchart of server-side first processing.
Figure 13:
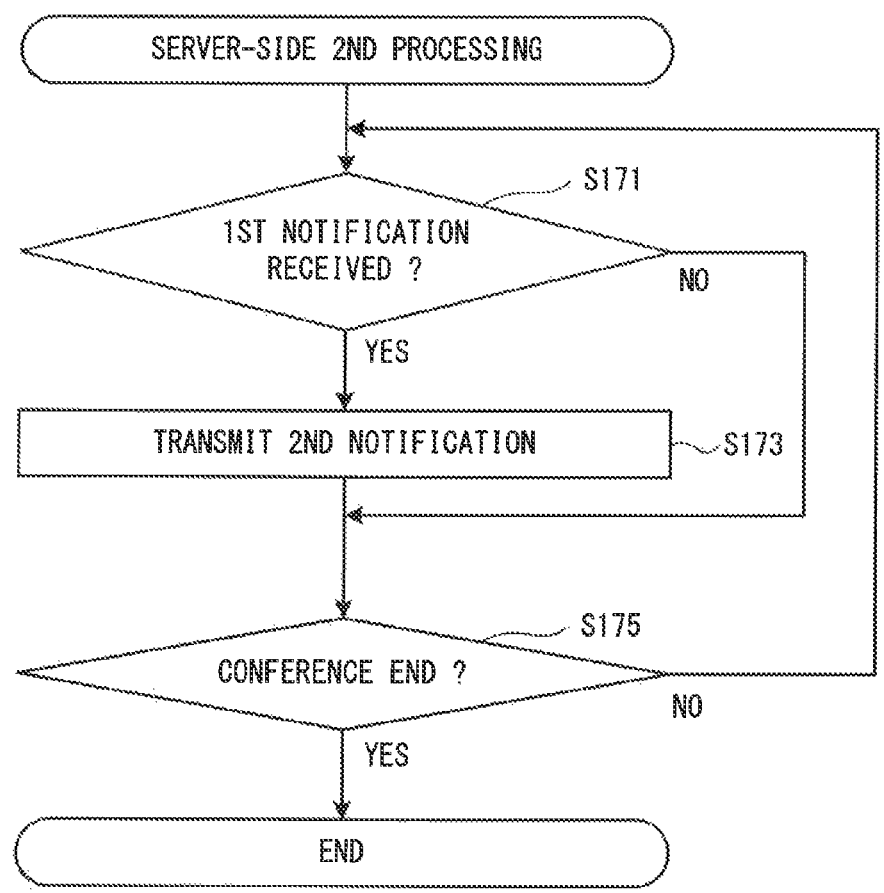
FIG. 13 is a flowchart of server-side second processing.

The server-side first processing and the server-side second processing that are performed by the CPU 161 of the server 16 will be explained with reference to FIG. 12 and FIG. 13. When the CPU 161 has received access to a URL corresponding to a specific conference room from at least one of the communication devices 15, the CPU 161 establishes a session corresponding to the specific conference room with the at least one communication device 15. When the session has been established, the server-side first processing and the server-side second processing are started by the CPU 161 executing programs stored in the storage portion 164. The server-side first processing and the server-side second processing are performed for each session corresponding to a conference room. The server-side first processing and the server-side second processing corresponding to the specific session are performed in parallel to the server-side first processing and the server-side second processing corresponding to another session. Further, the server-side first processing and the server-side second processing corresponding to the specific session are also performed in parallel with each other.

The server-side first processing will be explained with reference to FIG. 12. The CPU 161 determines whether or not the measurement packet transmitted from the communication device 15 has been received (step S151). When it is determined that the measurement packet has not been received (no at step S151), the CPU 161 advances the processing to step S155. When it is determined that the measurement packet has been received (yes at step S151), the CPU 161 returns the received measurement packet to the communication device 15 that transmitted the measurement packet (step S153). The CPU 161 advances the processing to step S155. Note that the CPU 111 of the communication device 15 calculates the jitter by transmitting the measurement packet to the server 16 and receiving the measurement packet from the server 16 in the device-side third processing (refer to FIG. 6) (step S119, refer to FIG. 6).

The CPU 161 determines whether or not the session that has been established with respect to the specific conference room has ended (step S155). When it is determined that the session corresponding to the specific conference room is continuing to be established (no at step S155), the CPU 161 returns the processing to step S151. When it is determined that the session that has been established with respect to the specific conference room has ended (yes at step S155), the CPU 161 ends the server-side first processing.

The server-side second processing will be explained with reference to FIG. 13. The CPU 161 determines whether or not the first notification packet transmitted from the communication device 15 has been received (step S171). When it is determined that the first notification packet has not been received (no at step S171), the CPU 161 advances the processing to step S175. When it is determined that the first notification packet has been received (yes at step S171), the CPU 161 acquires the device ID and the jitter value that are included in the received first notification packet. The CPU 161 generates the second notification packet that includes the acquired ID and jitter value. Based on the management table, the CPU 161 identifies the conference ID of the teleconference in which the communication device 15 that transmitted the first notification packet is participating. The CPU 161 identifies the device IDs associated with the same conference ID as the conference ID identified in the management table, as the device IDs of the communication devices 15 that are participating in the shared teleconference. The CPU 161 transmits the generated second notification packet to the communication devices 15 having the identified device IDs (step S173). The CPU 161 advances the processing to step S175. Note that the CPU 111 of the communication device 15 receives the second notification packet from the server 16 in the device-side fourth processing (refer to FIG. 7) and stores the device ID and the jitter value in association with each other in the table 1142 (step S135, refer to FIG. 7).

The CPU 161 determines whether or not the session established with respect to the specific conference room has ended (step S175). When it is determined that the session corresponding to the specific conference room is continuing to be established (no at step S175), the CPU 161 returns the processing to step S171. When it is determined that the session established for the specific conference room has ended (yes at step S175), the CPU 161 ends the server-side second processing.

As explained above, the CPU 111 of the communication device 11 sets the first provisional time and the second provisional time in accordance with whether the communication state is the first state or the second state (step S19, step S21) and sets the combined time (step S23). The combined time is a time period of sound in sound data that is included in the communication packet 153, and is also a transmission cycle of the communication packet 153. By setting the combined time in accordance with the communication state, the CPU 111 can adjust the transmission cycle when transmitting the communication packet 153 to the communication devices 12 and 13 participating in the teleconference. The longer the cycle at which the communication packet 153 is transmitted from the communication device 11 to the communication devices 12 and 13, the higher the possibility that jitter will be low. The lower the jitter, the more favorable the quality of the sound output from the communication devices 12 and 13 based on the sound data. Thus, by the CPU 111 setting the combined time in accordance with the communication state and optimizing jitter performance, it is possible to suppress deterioration in communication quality in the teleconference.

The CPU 111 of the communication device 11 finally determines, as the combined time, the larger of the set first provisional time and second provisional time (step S23). In other words, of the first provisional time and the second provisional time that are set using different methods, the CPU 111 sets as the combined time, the time that provides a greater jitter suppression effect. As a result, the CPU 111 can appropriately suppress deterioration in the communication quality of the teleconference.

The CPU 111 of the communication device 11 calculates, as the jitter value (step S119), a degree of variation in the time from transmitting the measurement packet to the server 16 (step S105) to then receiving the measurement packet that is returned from the server 16 (step S107). The CPU 111 of the communication device 11 acquires the jitter values that are calculated, respectively, by each of the communication devices 11, 12 and 13 participating in the teleconference (step S131 and step S133), and calculates a plurality of combined jitter values (step S45). The CPU 111 determines the communication state based on the largest jitter value among the calculated plurality of combined jitter values (step S50) and sets the first provisional time (step S51). Based on the first provisional time and the second provisional time, the CPU 111 finally sets the combined time (step S23). The CPU 111 transmits the communication packet 153 at the cycle corresponding to the set combined time (step S29).

In the table 1141 that is used when the CPU 111 sets the first provisional time, the larger the largest jitter value is, the larger the value of the combined time that is associated with it. In other words, the larger the largest jitter value is, the larger the value of the combined time that is determined as the first provisional time. The longer the transmission cycle of the communication packet 153 that is transmitted from the communication device 11, the higher the possibility that jitter will be low. In response to this, by the above-described processing, the CPU 111 can lengthen the combined time the larger the largest jitter value is, and thus lengthen the transmission cycle of the communication packet 153. As a result, the CPU 111 can effectively suppress jitter by lengthening the transmission cycle of the communication packet 153 the larger the largest jitter value is. In this manner, the CPU 111 can effectively suppress deterioration in the communication quality of the teleconference.

Further, in the above-described processing, the CPU 111 determines the communication state based on the largest jitter value among the plurality of calculated combined jitter values (step S50) and sets the first provisional time (step S51). When the first provisional time is finally set as the combined time, of the communication devices 12 and 13 participating in the teleconference, the jitter performance is optimized with whichever of the communication devices 12 and 13 the communication state is more unstable. Thus, the CPU 111 can effectively suppress deterioration in the communication quality with all of the communication devices 12 and 13 that are participating in the teleconference.

When the shared document packet is transmitted from the communication device 11, the size of the data included in the shared document packet is large and thus there is a high possibility that jitter will increase. In response to this, when it is determined that the shared document packet is being transmitted (yes at step S61), the CPU 111 can suppress jitter by setting the second provisional time to the largest value (120 ms) (step S67), thus lengthening the transmission cycle of the shared document packet. In this manner, the CPU 111 can suppress deterioration in the communication quality of the teleconference even when the communication state of the network 20 is unstable as a result of the transmission of the shared document packet.

When the video packet that includes the intra-frame compressed video data is transmitted from the communication device 11, the size of the data included in the video packet is large and thus there is a high possibility that jitter will increase. In response to this, when it is determined that the video packet including the intra-frame compressed video data is being transmitted (yes at step S65), the CPU 111 can suppress jitter by setting the second provisional time to the largest value (120 ms) (step S67), thus lengthening the transmission cycle of the video packet. In this manner, the CPU 111 can suppress deterioration in the communication quality of the teleconference even when the communication state of the network 20 is unstable due to the transmission of the video packet that includes the intra-frame compressed video data.

When the sampling data of 20 ms of sound is stored in the first storage portion 15A, the CPU 111 generates the unit sound data 152 by compressing the sampling data (step S87). As described above, the generation cycle of the unit sound data 152 is the same as the time period of 20 ms when the sampling data corresponding to 20 ms is stored in the first storage portion 15A. Further, the CPU 111 sets, as the combined time, one of the times of 20 ms, 40 ms, 60 ms, 80 ms, 100 ms and 120 ms (step S19, step S21, step S23). As a result, the communication packet 153 is transmitted from the communication device 11 at the cycle corresponding to the combined time (step S29), and is thus transmitted at the cycle 20 ms×N, which is an integral multiple of the generation cycle 20 ms of the unit sound data 152. The CPU 111 can therefore transmit the communication packet 153 that includes the unit sound data 152 corresponding to the combined time 20 ms×N, at a timing at which the sampling data corresponding to the combined time 20 ms×N is stored in the first storage portion 15A. The CPU 111 can therefore efficiently generate the unit sound data 152 from the sampling data and can transmit the communication packet 153 that includes the unit sound data 152 corresponding to the combined time without any delay.

The present disclosure is not limited to the above-described embodiment, and various modifications are possible. In the above-described embodiment, the unit sound data 152 is generated by compressing the sampling data (step S87), and next, the communication packet 153 that includes the number of pieces of unit sound data 152 corresponding to the set combined time is generated (step S27). In contrast to this, compressed data that is obtained by compressing the sampling data corresponding to the set combined time may be included in the communication packet 153. This will be explained as follows. After determining the combined time using the same method as in the above-described embodiment, in the device-side second processing (refer to FIG. 5), the CPU 111 of the communication device 11 may determine whether the sampling data corresponding to the combined time is stored in the first storage portion 15A (step S83). When it is determined that the sampling data corresponding to the combined time is stored in the first storage portion 15A (yes at step S83), the CPU 111 may acquire the sampling data corresponding to the combined time (step S85). The CPU 111 may compress the acquired sampling data corresponding to the combined time and may thereby generate sound data (step S87). The CPU 111 may store the generated sound data in the second storage portion 15B (step S89). In this case, at step S25 of the device-side first processing (refer to FIG. 4), the CPU 111 may always determine that the sound data corresponding to the combined time is stored in the second storage portion 15B (yes at step S25). The CPU 111 may generate the communication packet 153 that includes the sound data corresponding to the combined time (step S27) and may transmit the communication packet 153 at the cycle corresponding to the combined time (step S29).

In the device-side first processing (refer to FIG. 4), the CPU 111 of the communication device 11 finally sets, as the combined time, the largest value among the first provisional time and the second provisional time, by performing the processing at step S23. In contrast to this, the CPU 111 may finally set the first provisional time as the combined time, or may finally set the second provisional time as the combined time. Further, the CPU 111 may switch whether to set the first provisional time or the second provisional time as the combined time depending on settings. When the processing at step S29 is performed, the CPU 111 may measure the cycle of the combined time set at step S23, and may thus determine the transmission timing of the communication packet 153. When it is determined that the transmission timing has been reached, the CPU 111 may transmit, to the server 16, the communication packet 153 that is generated by the processing at step S27.

In the first setting processing (refer to FIG. 9), the CPU 111 of the communication device 11 calculated the plurality of combined jitter values, based on the jitter value measured by the communication device 11 and the plurality of jitter values measured by the communication devices 12 and 13, respectively (step S45). The CPU 111 applies the largest jitter value among the plurality of calculated combined jitter values to the table 1141, determines the communication state and sets the first provisional time (step S50, step S51). In contrast to this, the CPU 111 may select, as the largest jitter value, the largest jitter value among the plurality of jitter values measured by each of the communication devices 11 to 13, and may thus determine the communication state and set the first provisional time. Alternatively, the CPU 111 may apply the jitter value measured by the communication device 11 to the table 1141 and may thus determine the communication state and set the first provisional time. The CPU 111 may set the first provisional time using, in place of the table 1141, a predetermined relational expression that indicates a relationship between the jitter and the combined time.

In the second setting processing (refer to FIG. 11), the CPU 111 of the communication device 11 determines the communication state in accordance with the transmission state of the shared document packet and the video packet, and in accordance with the type of the video included in the video packet, and sets the second provisional time. In contrast to this, the CPU 111 may acquire the size of the data included in the communication packet 153 and may determine the communication state and set the second provisional time in accordance with the acquired size of the data. For example, the CPU 111 may determine that the communication state is the first state and set 20 ms as the second provisional time when the acquired size of the data is smaller than a predetermined threshold value, and the CPU 111 may determine that the communication state is the second state and set 120 ms as the second provisional time when the acquired size of the data is equal to or larger than the predetermined threshold value.

In the device-side second processing (refer to FIG. 5), the CPU 111 generates the unit sound data 152 by compressing the sampling data of sound corresponding to 20 ms, by performing the processing at step S87. In contrast to this, the CPU 111 may generate the unit sound data 152 by compressing the sampling data of sound corresponding to a predetermined period of time that is other than 20 ms. A minimum period of time that can be set as the combined time is not limited to 20 ms, and it may be another selected period of time. The period of time of the sound of the unit sound data 152 may be different to the minimum period of time that can be set as the combined time. The first storage portion 15A and the second storage portion 15B may be provided in a storage device other than the RAM 113.

In the device-side third processing (refer to FIG. 6), the CPU 111 calculates the delay time based on the time t1 when the measurement packet is transmitted to the server 16 and the time t2 when the measurement packet is received from the server 16. A transmission time when the measurement packet is transmitted from the communication device 11 to the server 16, and a transmission time when the measurement packet is transmitted from the server 16 to the communication device 11 are included in this delay time. In contrast to this, the CPU 111 may acquire, as the delay time, the transmission time when the measurement packet is transmitted from the communication device 11 to the server 16, or the transmission time when the measurement packet is transmitted from the server 16 to the communication device 11. The CPU 111 may transmit the measurement packet that is addressed to the communication devices 12 and 13 participating in the teleconference to the server 16. When the CPU 161 of the server 16 receives the measurement packet transmitted from the communication device 11, the CPU 161 may forward the received measurement packet to each of the communication devices 12 and 13. When the CPU 111 of each of the communication devices 12 and 13 receives the measurement packet from the server 16, the CPU 111 may return the measurement packet to the server 16. When the CPU 161 of the server 16 receives the measurement packets from the communication devices 12 and 13, the CPU 161 may forward the received measurement packets to the communication device 11. When the CPU 111 of the communication device 11 receives the measurement packet transmitted from the server 16, the CPU 111 may calculate the delay time based on a time at which the CPU 111 transmitted the measurement packet and a time at which the CPU 111 received the measurement packet. The CPU 111 may transmit, in order, a plurality of measurement packets that include a plurality of data of differing sizes. The CPU 111 may calculate, as jitter, an average value in place of the standard deviation.

For example, when the CPU 111 of the communication device 11 starts the device-side first processing, the CPU 111 may cause a screen, on which an email address and a password can be input, to be displayed on the display 116. When an operation to input the email address and the password is detected via the input portion 118, the CPU 111 may identify at least one teleconference in which the user corresponding to the input email address and password can participate. The CPU 111 may cause a screen, on which the identified at least one teleconference can be selected, to be displayed on the display 116. In this way, the user can participate in a selected teleconference by selecting one of the at least one teleconferences displayed on the display 116.

Further, the CPU 111 may transmit the input email address and password to the server 16. The CPU 161 of the server 16 may authenticate the user using the received email address and password. When the authentication is successful, the CPU 161 may identify the at least one teleconference in which the user can participate, and may transmit the conference ID of the identified at least one teleconference to the communication device 15. Based on the conference ID received from the server 16, the CPU 111 of the communication device 15 may identify the at least one teleconference in which the user corresponding to the input email address and password can participate.

The CPU 111 may transmit, to the server 16, a request packet that includes the device ID of the communication device 11 and the conference ID of the teleconference selected by the user. When the CPU 161 of the server 16 receives the request packet, the CPU 161 may associate the device ID and the conference ID included in the request packet with each other and may store the associated data in a management table stored in the storage portion 164.

In the processing at step S11, the CPU 111 may determine whether or not the input operation to select the at least one teleconference has been detected via the input portion 118. When the input operation to select the teleconference has been detected (yes at step S11), the CPU 111 may start the selected teleconference.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A non-transitory computer-readable medium storing computer-readable instructions, the instructions, when executed by a processor of a communication device configured to connect a network, performing processes comprising:
    a first judgment operation judging whether sampling data of sound for a period of time equal to or greater than a predetermined period of time is stored in a first storage portion;
    a first generation operation sequentially generating, in response to the first judgment operation judging that the sampling data of sound for the period of time equal to or greater than the predetermined period of time is stored in the first storage portion, unit sound data by sequentially compressing the sampling data in the first storage portion for the predetermined period of time in an order of storage in the first storage portion;
    a storage operation storing the unit sound data in a second storage portion;
    a determination operation determining whether a communication state of the network is one of a first state and a second state different from the first state based on at least one of transmission data transmitted to the network and reception data received from the network;
    a setting operation setting a combined time corresponding to a length of time of sound in sound data included in a single packet, the combined time being one of:
        a first period of time when the determination operation determines that the communication state is the first state; and
        a second period of time longer than the first period of time when the determination operation determines that the communication state is the second state;
    a second judgment operation judging whether the unit sound data for a period of time equal to or greater than the combined time is stored in the second storage portion;
    a second generation operation generating the packet including the unit sound data for the combined time in response to the second judgment operation judging that the unit sound data for the period of time equal to or greater than the combined time is stored in the second storage portion; and
    a transmission operation transmitting, to at least one counterpart device at a cycle corresponding to the combined time, the packet generated by the second generation operation.

2. The non-transitory computer-readable medium according to claim 1, wherein the instructions, when executed by the processor of the communication device, perform the processes further comprising a measurement operation measuring first jitter, the first jitter indicating a degree of variation in at least one of a first delay time and a second delay time, the first delay time being from when the transmission data is transmitted to a conference server to when the transmission data is received by the conference server, and a second delay time being from when the reception data is transmitted by the conference server to when the reception data is received by the communication device, the conference server connected to the network and conducting a teleconference among the communication device and a plurality of the counterpart devices, and wherein
    the determination operation determines that the communication state is the first state when the first jitter is a first value, and determines that the communication state is the second state when the first jitter is a second value greater than the first value.

3. The non-transitory computer-readable medium according to claim 2, wherein the instructions, when executed by the processor of the communication device, perform the processes further comprising an acquisition operation acquiring a plurality of second jitter indicating a degree of variation in at least one of a plurality of third delay times and a plurality of fourth delay times, each of the third delay times being from when each of the plurality of counterpart devices transmits the transmission data to the conference server to when the conference server receives the transmission data, and each of the fourth delay times being from when the reception data is transmitted by the conference server to when the reception data is received by each of the plurality of counterpart devices, and wherein the determination operation determines that the communication state is the first state when a largest jitter, from among the first jitter and the second jitter, is a first value, and determines that the communication state is the second state when the largest jitter is a second value that is larger than the first value.

4. The non-transitory computer-readable medium according to claim 3, wherein the largest jitter is selected from among a plurality of combined jitter, each of the combined jitter being defined by combining the first jitter and one of the plurality of the second jitter.

5. The non-transitory computer-readable medium according to claim 1, wherein the instructions, when executed by the processor of the communication device, perform the processes further comprising a third judgment operation judging whether document data is being transmitted to at least one of the counterpart devices, the document data indicating a document to be shared in a teleconference, and wherein the determination operation determines that the communication state is the first state in response to the third judgment operation judging that the document data is not being transmitted, and determines that the communication state is the second state in response to the third judgment operation judging that the document data is being transmitted.

6. The non-transitory computer-readable medium according to claim 1, wherein the instructions, when executed by the processor of the communication device, perform the processes further comprising a third judgment operation judging whether intra-frame compressed image data is being transmitted to at least one of the counterpart devices in a teleconference, and wherein the determination operation determines that the communication state is the first state in response to the third judgment operation judging that the intra-frame compressed image data is not being transmitted, and determines that the communication state is the second state in response to the third judgment operation judging that the intra-frame compressed image data is being transmitted.

7. The non-transitory computer-readable medium according to claim 1, wherein the first generation operation generates the unit sound data at a first cycle, and wherein the transmission operation transmits the packet at one of a plurality of second cycles that are each an integral multiple of the first cycle.

8. The non-transitory computer-readable medium according to claim 1, wherein the instructions, when executed by the processor of the communication device, perform the processes further comprising a third judgment operation judging whether the communication state has changed, wherein the determination operation determines that the communication state is one of the first state and the second state in response to the third judgment operation judging that the communication state has changed.

9. A non-transitory computer-readable medium storing computer-readable instructions, the instructions, when executed by a processor of a communication device, performing processes comprising:

a determination operation determining whether a communication state with a conference server via a network is one of a first state and a second state different from the first state based on at least one of transmission data transmitted by the communication device to the conference server and reception data received by the communication device from the conference server;

a setting operation setting a first period of time as a combined time in response to the determination operation determining that the communication state is the first state, and setting, as the combined time, a second period of time that is longer than the first period of time in response to the determination operation determining that the communication state is the second state;

a first generation operation generating, from sampling data of sound stored in a first storage portion, sound data for the combined time, by sequentially compressing the sampling data for the combined time in an order of storage in the first storage portion;

a second generation operation generating a packet including the sound data; and a transmission operation transmitting the packet to the conference server at a cycle corresponding to the combined time.

10. The non-transitory computer-readable medium according to claim 9, wherein the first generation operation comprises:
a third generation operation sequentially generating unit sound data by sequentially compressing the sampling data for the predetermined period of time in the order of storage of the sampling data in the first storage portion, the unit sound data being obtained by compressing the sampling data for a predetermined period of time equal to or less than the combined time; and a storage operation storing the unit sound data generated by the third generation operation in the second storage portion, wherein the instructions, when executed by the processor of the communication device, perform the processes further comprising a judgment operation judging whether the unit sound data for a period of time equal to or greater than the combined time is stored in a second storage portion, and wherein the second generation operation generates a packet including the unit sound data for the combined time in response to the judgment operation judging that the unit sound data for the period of time equal to or greater than the combined time is stored in the second storage portion.

11. A communication device capable of communication with a plurality of counterpart devices via a network, the communication device comprising:

a processor; and a memory storing computer-readable instructions, the instructions, when executed by the processor, performing processes comprising:

a first judgment operation judging whether sampling data of sound for a period of time equal to or greater than a predetermined period of time is stored in a first storage portion;

a first generation operation sequentially generating, in response to the first judgment operation judging that the sampling data of sound for the first period of time equal to or greater than the predetermined period of time is stored in the first storage portion, unit sound data by sequentially compressing the sampling data in the first storage portion for the predetermined period of time in an order of storage in the first storage portion;
a storage operation storing the unit sound data in a second storage portion;
a determination operation determining whether a communication state of the network is one of a first state and a second state different from the first state, based on at least one of transmission data that is transmitted to the network and reception data received from the network;
a setting operation setting a combined time corresponding to a length of time of sound in sound data included in a single packet, the combined time being one of:
 a first period of time when the determination operation determines that the communication state is the first state; and
 a second period of time longer than the first period of time when the determination operation determines that the communication state is the second state;
a second judgment operation judging whether the unit sound data for a period of time equal to or greater than the combined time is stored in the second storage portion;
a second generation operation generating the packet including the unit sound data for the combined time in response to the second judgment operation judging that the unit sound data for the period of time equal to or greater than the combined time is stored in the second storage portion; and
a transmission operation transmitting, to at least one counterpart device at a cycle corresponding to the combined time, the packet generated by the second generation operation.

12. The communication device according to claim 11, wherein the instructions, when executed by the processor, perform the processes further comprising a measurement operation measuring first jitter, the first jitter indicating a degree of variation in at least one of a first delay time and a second delay time, the first delay time being from when the transmission data is transmitted to a conference server to when the transmission data is received by the conference server, and a second delay time being from when the reception data is transmitted by the conference server to when the reception data is received by the communication device, the conference server connected to the network and conducting a teleconference among the communication device and a plurality of the counterpart devices, and wherein
the determination operation determines that the communication state is the first state when the first jitter is a first value, and determines that the communication state is the second state when the first jitter is a second value greater than the first value.

13. The communication device according to claim 12, wherein the instructions, when executed by the processor, perform the processes further comprising:
an acquisition operation acquiring a plurality of second jitter indicating a degree of variation in at least one of a plurality of third delay times and a plurality of fourth delay times, each of the third delay times being from when each of the plurality of counterpart devices transmits the transmission data to the conference server to when the conference server receives the transmission data, and each of the fourth delay times being from when the reception data is transmitted by the conference server to when the reception data is received by each of the plurality of counterpart devices, and wherein
the determination operation determines that the communication state is the first state when a largest jitter, from among the first jitter and the second jitter, is a first value, and determines that the communication state is the second state when the largest jitter is a second value that is larger than the first value.

14. The communication device according to claim 13, wherein
the largest jitter is selected from among a plurality of combined jitter, each of the combined jitter being defined by combining the first jitter and one of the plurality of the second jitter.

15. The communication device according to claim 11, wherein the instructions, when executed by the processor, perform the processes further comprising a third judgment operation judging whether document data is being transmitted to at least one of the counterpart devices; and wherein
the determination operation determines that the communication state is the first state when it is judged by the third judgment operation that the shared document data is not being transmitted, and determines that the communication state is the second state when it is judged by the third judgment operation that the shared document data is being transmitted.

16. The communication device according to claim 11, wherein the instructions, when executed by the processor, perform the processes further comprising a third judgment operation judging whether intra-frame compressed image data is being transmitted to at least one of the counterpart devices in a teleconference, and wherein
the determination operation determines that the communication state is the first state in response to the third judgment operation judging that the intra-frame compressed image data is not being transmitted, and determines that the communication state is the second state in response to the third judgment operation judging that the intra-frame compressed image data is being transmitted.

17. The communication device according to claim 11, wherein
the first generation operation generates the unit sound data at a first cycle, and wherein
the transmission operation transmits the packet at one of a plurality of second cycles that are each an integral multiple of the first cycle.

18. The communication device according to claim 11, wherein the instructions, when executed by the processor of the communication device, perform the processes further comprising a third judgment operation judging whether the communication state has changed, wherein
the determination operation determines that the communication state is one of the first state and the second state in response to the third judgment operation judging that the communication state has changed.

* * * * *